(12) United States Patent
Park et al.

(10) Patent No.: US 12,498,874 B2
(45) Date of Patent: Dec. 16, 2025

(54) STORAGE DEVICE AND OPERATING METHOD OF STORAGE DEVICE

(71) Applicant: SAMSUNG ELECTRONICS CO., LTD., Suwon-si (KR)

(72) Inventors: Jinwoo Park, Suwon-si (KR); Minji Kim, Suwon-si (KR); Sangwon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 18/534,379

(22) Filed: Dec. 8, 2023

(65) Prior Publication Data

US 2024/0345758 A1 Oct. 17, 2024

(30) Foreign Application Priority Data

Apr. 11, 2023 (KR) ........................ 10-2023-0047553

(51) Int. Cl.
G06F 3/06 (2006.01)
G11C 16/16 (2006.01)

(52) U.S. Cl.
CPC .......... *G06F 3/0652* (2013.01); *G06F 3/0604* (2013.01); *G06F 3/0656* (2013.01); *G06F 3/0688* (2013.01)

(58) Field of Classification Search
CPC .... G06F 3/0604; G06F 3/0652; G06F 3/0656; G06F 3/0688; G06F 3/0658; G06F 3/064; G06F 3/0659; G06F 3/0683; G06F 2212/1016; G06F 2212/7205; G11C 16/16

USPC .................................................. 711/154, 103
See application file for complete search history.

(56) References Cited

U.S. PATENT DOCUMENTS

| | | | |
|---|---|---|---|
| 6,034,897 A * | 3/2000 | Estakhri ................. | G11C 16/08 365/230.03 |
| 8,838,875 B2 | 9/2014 | Park | |
| 9,032,177 B2 | 5/2015 | Alcantara et al. | |
| 9,477,408 B1 | 10/2016 | Perlstein et al. | |
| 11,074,011 B2 | 7/2021 | Muthiah | |
| 2018/0081567 A1* | 3/2018 | Goel ..................... | G06F 3/0656 |
| 2019/0026191 A1* | 1/2019 | Battaje ................. | G06F 3/0641 |
| 2019/0087128 A1 | 3/2019 | Shin | |
| 2021/0064286 A1* | 3/2021 | Jung ..................... | G06F 3/0659 |
| 2022/0076755 A1 | 3/2022 | Kim et al. | |

(Continued)

Primary Examiner — Hashem Farrokh
(74) Attorney, Agent, or Firm — Fish & Richardson P.C.

(57) ABSTRACT

Disclosed is a storage device which includes nonvolatile memory devices each including a plurality of memory blocks, a memory controller that controls the nonvolatile memory devices, and a buffer memory that buffers data to be written in the nonvolatile memory devices. In an on-time erase operation, the memory controller controls the nonvolatile memory devices such that an erase operation is performed in a memory block for each of the nonvolatile memory devices. When an early erase condition is satisfied, the memory controller selects nonvolatile memory device among the nonvolatile memory devices and controls the selected nonvolatile memory device such that the erase operation is performed in a memory block of the selected nonvolatile memory device. When a free capacity of the buffer memory is smaller than a first threshold value, the memory controller determines that the early erase condition is satisfied.

19 Claims, 15 Drawing Sheets

(56) References Cited

U.S. PATENT DOCUMENTS

2022/0129197 A1     4/2022  Choi et al.
2022/0300205 A1*    9/2022  Lee ...................... G06F 3/0659

* cited by examiner

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2023-0047553 filed on Apr. 11, 2023, in the Korean Intellectual Property Office, the disclosure of which is incorporated by reference herein in its entirety.

BACKGROUND

A storage device refers to a device, which stores data under control of a host device, such as a computer, a smartphone, or a smart pad. The storage device may store data on a magnetic disk, such as a hard disk drive (HDD), or in a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory, a phase-change random access memory (PRAM), a magnetic random access memory (MRAM), a resistive random access memory (RRAM), or a ferroelectric random access memory (FRAM).

The flash memory has an erase-before-write characteristic of first performing an erase operation to write data. That is, the storage device including the flash memory may frequently perform the erase operation. In the flash memory, the erase speed or the write speed is slower than the read speed. The erase operation may act as a factor that hinders the operating speed of the storage device including the flash memory.

SUMMARY

Implementations of the present disclosure provide a storage device with an improved operating speed and an operating method of the storage device.

According to some implementations, a storage device includes a plurality of nonvolatile memory devices each including a plurality of memory blocks, a memory controller that controls the plurality of nonvolatile memory devices, and a buffer memory that buffers data to be written in the plurality of nonvolatile memory devices. In an on-time erase operation, the memory controller controls the plurality of nonvolatile memory devices such that an erase operation is performed in a memory block for each of the plurality of nonvolatile memory devices. When an early erase condition is satisfied, the memory controller selects nonvolatile memory device among the plurality of nonvolatile memory devices and controls the selected nonvolatile memory device such that the erase operation is performed in a memory block of the selected nonvolatile memory device. When a free capacity of the buffer memory is smaller than a first threshold value, the memory controller determines that the early erase condition is satisfied.

According to some implementations, an operating method of a storage device which includes a plurality of nonvolatile memory devices each including a plurality of memory blocks includes performing an on-time erase operation in which erase operations are continuously performed in memory blocks respectively included in the plurality of nonvolatile memory devices, and performing an erase operation with respect to a memory block belonging to a nonvolatile memory device among the plurality of nonvolatile memory devices, when an early erase condition is satisfied.

According to some implementations, a storage device includes a plurality of nonvolatile memory devices each including a plurality of memory blocks, a buffer memory that buffers data to be written in the plurality of nonvolatile memory devices, and a memory controller that controls the plurality of nonvolatile memory devices. In an on-time erase operation, the memory controller sequentially controls the plurality of nonvolatile memory devices such that an erase operation is performed in a memory block for each of the plurality of nonvolatile memory devices. When an early erase condition is satisfied, the memory controller selects nonvolatile memory device among the plurality of nonvolatile memory devices and controls the selected nonvolatile memory device such that the erase operation is performed in a memory block of the selected nonvolatile memory device. When a free capacity of the buffer memory is smaller than a threshold value and when a time passing after an opened memory block of at least one nonvolatile memory device among the plurality of nonvolatile memory devices is erased is greater than a threshold value, the memory controller determines that the early erase condition is satisfied. When a free capacity of the buffer memory is smaller than a threshold value and when the amount of data written in an opened memory block of at least one nonvolatile memory device among the plurality of nonvolatile memory devices is greater than a threshold value, the memory controller determines that the early erase condition is satisfied.

DETAILED DESCRIPTION

Below, implementations of the present disclosure will be described in detail with reference to the attached drawings to such an extent that the implementations of the present disclosure are readily understood by one skilled in the art to which the present disclosure belongs.

Figure 1:
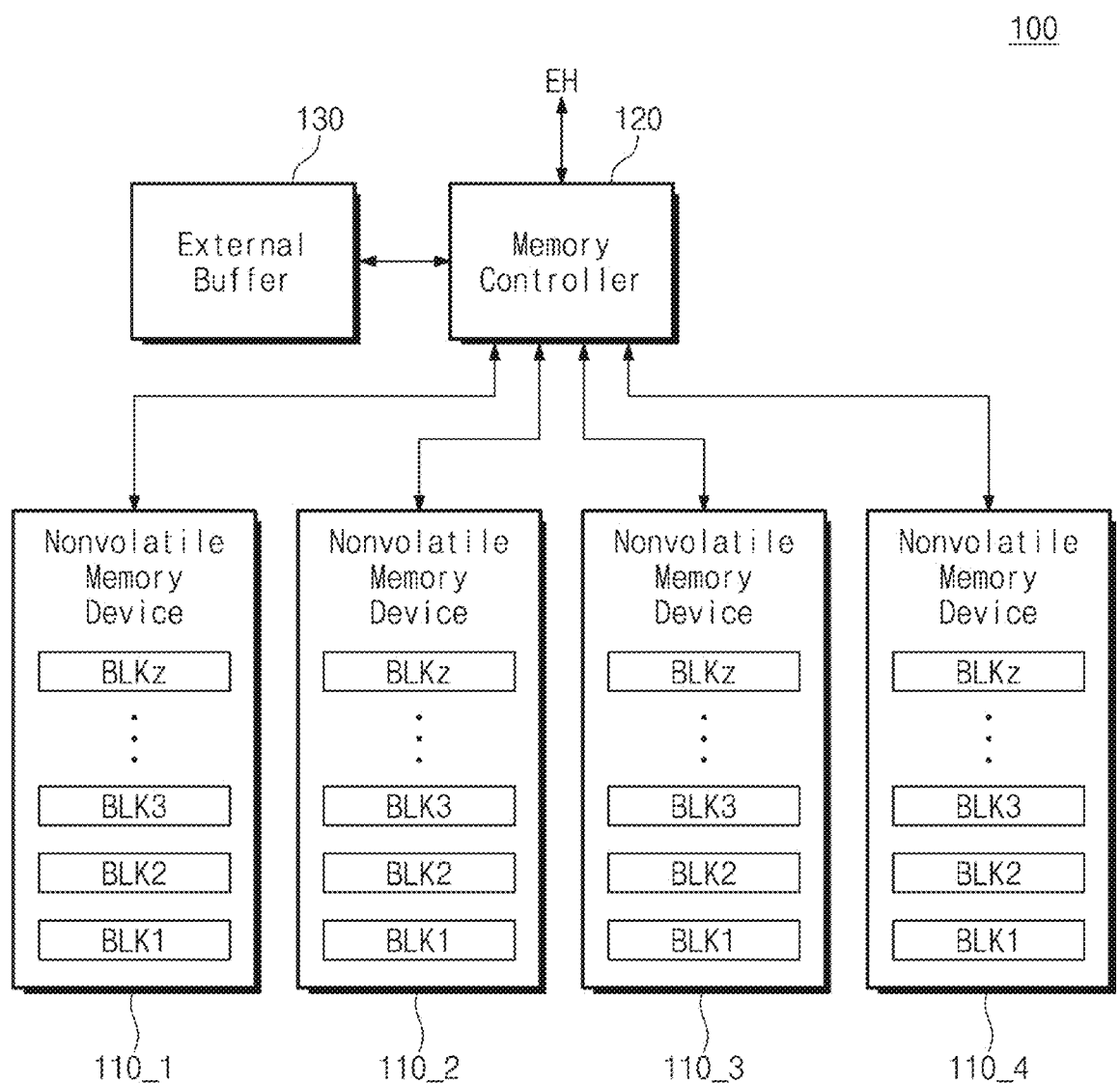
FIG. 1 illustrates a storage device according to some implementations of the present disclosure.

FIG. 1 illustrates a storage device 100 according to some implementations of the present disclosure. Referring to FIG. 1, the storage device 100 may include a plurality of nonvolatile memory devices 110_1, 110_2, 110_3, and 110_4, a memory controller 120, and an external buffer 130.

The plurality of nonvolatile memory devices 110_1, 110_2, 110_3, and 110_4 may include at least one of various nonvolatile memory devices such as a flash memory device, a phase-change memory device, a ferroelectric memory device, a magnetic memory device, and a resistive memory device. Each of the plurality of nonvolatile memory devices 110_1, 110_2, 110_3, and 110_4 may be implemented with a semiconductor chip or a semiconductor package.

Each of the plurality of nonvolatile memory devices 110_1, 110_2, 110_3, and 110_4 may include a plurality of memory blocks BLK1 to BLKz. Each of the plurality of memory blocks BLK1 to BLKz may include a plurality of memory cells. Each of the plurality of memory cells may store two or more bits.

In some implementations, each of the plurality of memory blocks BLK1 to BLKz may correspond to a unit of the erase operation. Memory cells belonging to each memory block may be erased at the same time. As another example, each of the memory blocks BLK1 to BLKz may be divided into a plurality of sub-blocks. Each of the plurality of sub-blocks may correspond to a unit of the erase operation. As another example, two or more memory blocks may constitute one super block. Each super block may correspond to a unit of the erase operation. The unit of the erase operation is referred to as an erase unit. That is, the erase unit may be a memory block, a sub-block of a memory block, or a super block of memory blocks.

The memory controller 120 may receive various requests for writing data in the plurality of nonvolatile memory devices 110_1, 110_2, 110_3, and 110_4 or reading data from the plurality of nonvolatile memory devices 110_1, 110_2, 110_3, and 110_4 from an external host device EH. The memory controller 120 may store (or buffer) user data communicated with the external host device EH in the external buffer 130 and may store meta data for managing the storage device 100 in the external buffer 130.

The memory controller 120 may control the plurality of nonvolatile memory devices 110_1, 110_2, 110_3, and 110_4 in parallel or independently. The memory controller 120 may request the write operation, the read operation, or the erase operation from the plurality of nonvolatile memory devices 110_1, 110_2, 110_3, and 110_4 in parallel or independently.

The external buffer 130 may include a random access memory. For example, the external buffer 130 may include at least one of a dynamic random access memory, a phase-change random access memory, a ferroelectric random access memory, a magnetic random access memory, and a resistive random access memory.

Figure 2:
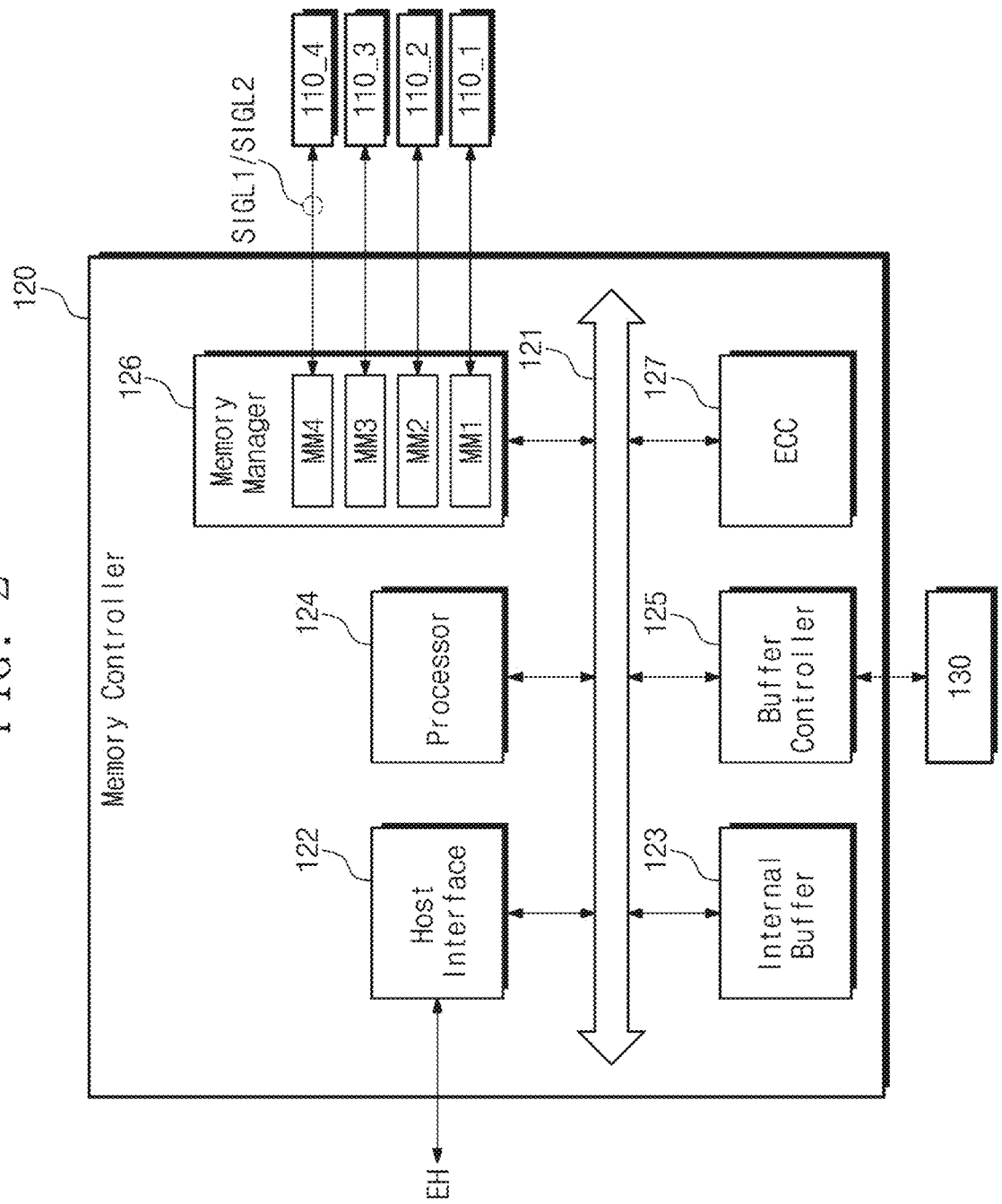
FIG. 2 illustrates a memory controller according to some implementations of the present disclosure.

FIG. 2 illustrates the memory controller 120 according to some implementations of the present disclosure. Referring to FIGS. 1 and 2, the memory controller 120 may include a bus 121, a host interface 122, an internal buffer 123, a processor 124, a buffer controller 125, a memory manager 126, and an error correction code (ECC) block 127.

The bus 121 may provide communication channels between the components of the memory controller 120. The host interface 122 may receive various requests from the external host device EH and may parse the received requests. The host interface 122 may store the parsed requests in the internal buffer 123.

The host interface 122 may transmit various responses to the external host device EH. The host interface 122 may exchange signals with the external host device EH in compliance with a given communication protocol. The internal buffer 123 may include a random access memory. For example, the internal buffer 123 may include a static random access memory or a dynamic random access memory.

The processor 124 may execute an operating system or firmware for driving the memory controller 120. The processor 124 may read the parsed requests stored in the internal buffer 123 and may generate addresses and commands for controlling the plurality of nonvolatile memory devices 110_1, 110_2, 110_3, and 110_4. The processor 124 may provide the generated commands and addresses to the memory manager 126.

The processor 124 may store various meta data for managing the storage device 100 in the internal buffer 123. The processor 124 may access the external buffer 130 through the buffer controller 125. The processor 124 may control the buffer controller 125 and the memory manager 126 such that the user data stored in the external buffer 130 are transmitted to the plurality of nonvolatile memory devices 110_1, 110_2, 110_3, and 110_4.

The processor 124 may control the host interface 122 and the buffer controller 125 such that the data stored in the external buffer 130 are transmitted to the external host device EH. The processor 124 may control the buffer controller 125 and the memory manager 126 such that the data received from the plurality of nonvolatile memory devices 110_1, 110_2, 110_3, and 110_4 are stored in the external buffer 130. The processor 124 may control the host interface 122 and the buffer controller 125 such that the data received from the external host device EH are stored in the external buffer 130.

Under control of the processor 124, the buffer controller 125 may write data in the external buffer 130 or may read data from the external buffer 130. The memory manager 126 may communicate with the plurality of nonvolatile memory devices 110_1, 110_2, 110_3, and 110_4 through first signal lines SIGL1 and second signal lines SIGL2 under control of the processor 124.

The memory manager 126 may control the plurality of nonvolatile memory devices 110_1, 110_2, 110_3, and 110_4 under control of the processor 124. For example, the memory manager 126 may access the plurality of nonvolatile memory devices 110_1, 110_2, 110_3, and 110_4 through the first signal lines SIGL1 and the second signal lines SIGL2. The memory controller 126 may control the plurality of nonvolatile memory devices 110_1, 110_2, 110_3, and 110_4 in compliance with the protocol that is determined based on the standard or is determined by the manufacturer.

The memory manager 126 may include a plurality of memory management modules MM1 to MM4 respectively corresponding to the plurality of nonvolatile memory devices 110_1, 110_2, 110_3, and 110_4. Each of the plurality of memory management modules MM1 to MM4 may access the corresponding nonvolatile memory device among the plurality of nonvolatile memory devices 110_1, 110_2, 110_3, and 110_4 through the first signal lines SIGL1 and each of signal lines SIGL2.

For example, each of the plurality of memory management modules MM1 to MM4 may transmit commands for the write operation, the read operation, and the erase operation to the corresponding nonvolatile memory device among the plurality of nonvolatile memory devices 110_1, 110_2, 110_3, and 110_4. Each of the plurality of memory management modules MM1 to MM4 may exchange data with the corresponding nonvolatile memory device among the plurality of nonvolatile memory devices 110_1, 110_2, 110_3, and 110_4.

Each of the plurality of memory management modules MM1 to MM4 may include a queue that manages commands for the corresponding nonvolatile memory device among the plurality of nonvolatile memory devices 110_1, 110_2, 110_3, and 110_4. Each of the plurality of memory management modules MM1 to MM4 may store two or more commands in the queue and may perform scheduling (or ordering) of the stored commands.

The ECC block 127 may perform error correction encoding on data to be transmitted to the plurality of nonvolatile memory devices 110_1, 110_2, 110_3, and 110_4 by using the ECC. The ECC block 127 may perform error correction decoding on data received from the plurality of nonvolatile memory devices 110_1, 110_2, 110_3, and 110_4 by using the ECC.

In some implementations, the memory controller 120 may use at least one memory block as a meta storage region. The memory controller 120 may store, in the meta storage region, original data of a map table between logical addresses of the external host device EH and physical addresses of the plurality of nonvolatile memory devices 110_1, 110_2, 110_3, and 110_4. Alternatively, the memory controller 120 may store original data of various meta data for managing the storage device 100 in the meta storage region. The memory controller 120 may load and use the map table or the meta data of the meta storage region to the internal buffer 123 or the external buffer 130.

In some implementations, the external buffer 130 and the buffer controller 125 may be omitted in the storage device 100. When the external buffer 130 and the buffer controller 125 are omitted, the functions that are described as being performed by the external buffer 130 and the buffer controller 125 may be performed by the internal buffer 123.

Figure 3:
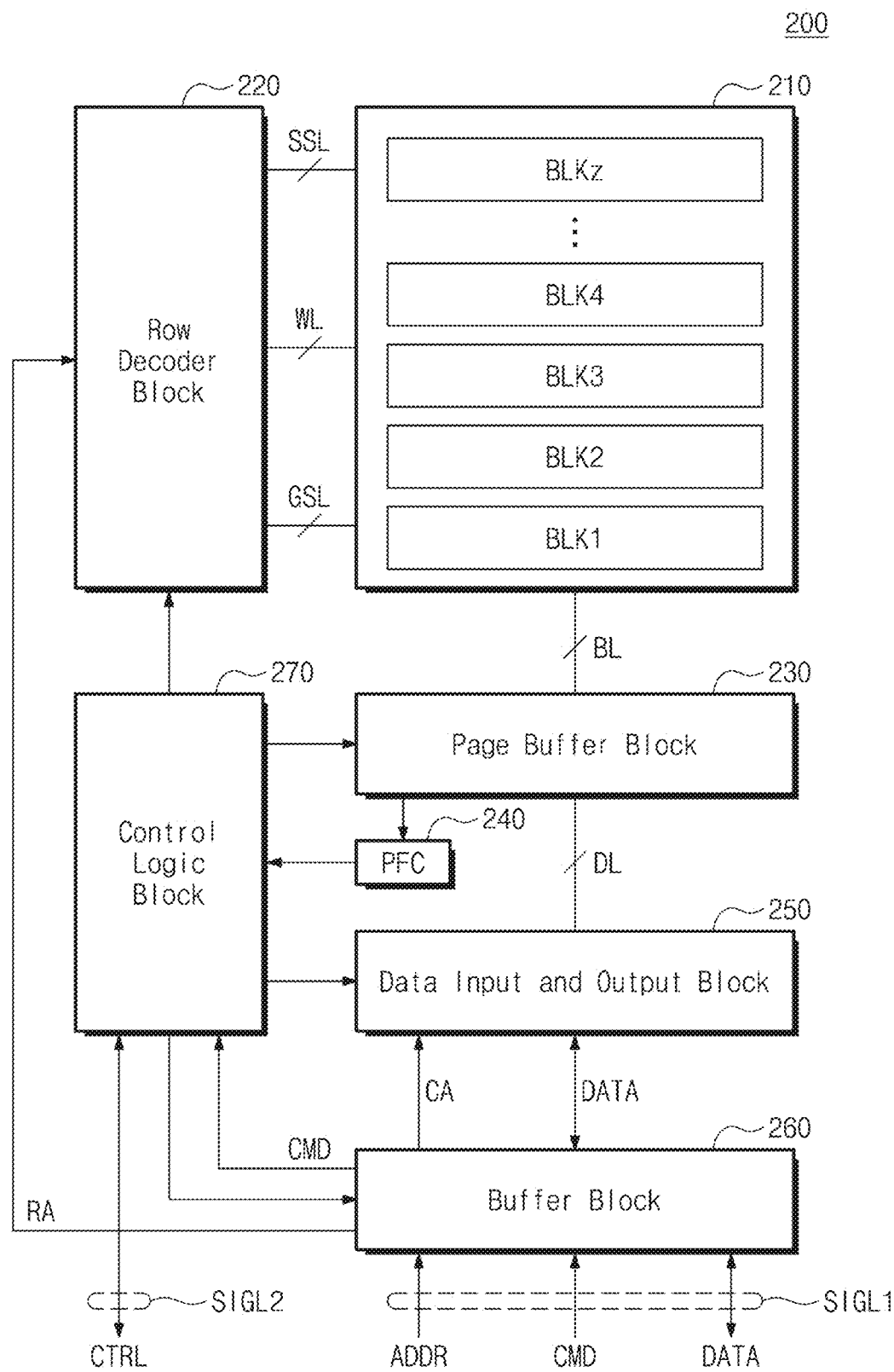
FIG. 3 is a block diagram illustrating a nonvolatile memory device according to some implementations of the present disclosure.

FIG. 3 is a block diagram illustrating a nonvolatile memory device 200 according to some implementations of the present disclosure. Referring to FIGS. 2 and 3, the nonvolatile memory device 200 may correspond to one of the plurality of nonvolatile memory devices 110_1, 110_2, 110_3, and 110_4 of FIG. 1. The nonvolatile memory device 200 may include a memory cell array 210, a row decoder block 220, a page buffer block 230, a pass/fail check block (PFC) 240, a data input and output block 250, a buffer block 260, and a control logic block 270.

The memory cell array 210 includes the plurality of memory blocks BLK1 to BLKz. Each of the memory blocks BLK1 to BLKz includes a plurality of memory cells. Each of the memory blocks BLK1 to BLKz may be connected to the row decoder block 220 through at least one ground selection line GSL, word lines WL, and at least one string selection line SSL. Some of the word lines WL may be used as dummy word lines. Each of the memory blocks BLK1 to BLKz may be connected to the page buffer block 230 through a plurality of bit lines BL. The plurality of memory blocks BLK1 to BLKz may be connected in common to the plurality of bit lines BL.

In some implementations, each of the plurality of memory blocks BLK1 to BLKz may correspond to a unit of the erase operation. Memory cells belonging to each memory block may be erased at the same time. As another example, each of the memory blocks BLK1 to BLKz may be divided into a plurality of sub-blocks. Each of the plurality of sub-blocks may correspond to a unit of the erase operation. As another example, two or more memory blocks may constitute one super block. Each super block may correspond to a unit of the erase operation. The unit of the erase operation is referred to as an erase unit. That is, the erase unit may be a memory block, a sub-block of a memory block, or a super block of memory blocks.

The row decoder block 220 is connected to the memory cell array 210 through the ground selection lines GSL, the word lines WL, and the string selection lines SSL. The row decoder block 220 operates under control of the control logic block 270.

The row decoder block 220 may decode a row address RA received from the buffer block 260 and may control voltages to be applied to the string selection lines SSL, the word lines WL, and the ground selection lines GSL based on the decoded row address.

The page buffer block 230 is connected to the memory cell array 210 through the plurality of bit lines BL. The page buffer block 230 is connected to the data input and output block 250 through a plurality of data lines DL. The page buffer block 230 operates under control of the control logic block 270.

In the program operation, the page buffer block 230 may store data to be written in memory cells. The page buffer block 230 may apply voltages to the plurality of bit lines BL based on the stored data. In the read operation or in the verify read operation that is performed in the program operation or the erase operation, the page buffer block 230 may sense voltages of the bit lines BL and may store a sensing result.

In the verify read operation associated with the program operation or the erase operation, the PFC block 240 may verify the sensing result of the page buffer block 230. For example, in the verify read operation that is performed in the program operation, the PFC block 240 may count the number of values (e.g., the number of 0s) corresponding to on-cells that are not programmed to a target threshold voltage or higher.

In the verify read operation that is performed in the erase operation, the PFC block 240 may count the number of values (e.g., the number of 1s) corresponding to off-cells that are not erased to a target threshold voltage or lower. When the counting result is greater than or equal to a threshold value, the PFC block 240 may output a fail signal to the control logic block 270. When the counting result is smaller than the threshold value, the PFC block 240 may output a pass signal to the control logic block 270. Depending on the verification result of the PFC block 240, a program loop of the program operation may be further performed, or an erase loop of the erase operation may be further performed.

The data input and output block 250 is connected to the page buffer block 230 through the plurality of data lines DL. The data input and output block 250 may receive a column address CA from the buffer block 260. The data input and output block 250 may output the data read by the page buffer block 230 to the buffer block 260 depending on the column address CA. The data input and output block 250 may provide the data received from the buffer block 260 to the page buffer block 230, based on the column address CA.

Through the first signal lines SIGL1, the buffer block 260 may receive a command CMD and an address ADDR from an external device and may exchange data DATA with the external device. The buffer block 260 may operate under control of the control logic block 270. The buffer block 260 may provide the command CMD to the control logic block 270. The buffer block 260 may provide the row address RA of the address ADDR to the row decoder block 220 and may provide the column address CA of the address ADDR to the data input and output block 250. The buffer block 260 may exchange the data DATA with the data input and output block 250.

The control logic block 270 may exchange a control signal CTRL with the external device through the second signal lines SIGL2. The control logic block 270 may allow the buffer block 260 to route the command CMD, the address ADDR, and the data DATA. The control logic block 270 may decode the command CMD received from the buffer block 260 and may control the nonvolatile memory device 200 based on the decoded command.

In some implementations, the nonvolatile memory device 200 may be manufactured in a bonding method. The memory cell array 210 may be manufactured by using a first wafer, and the row decoder block 220, the page buffer block 230, the PFC block 240, the data input and output block 250, the buffer block 260, and the control logic block 270 may be manufactured by using a second wafer. The nonvolatile memory device 200 may be implemented by coupling the first wafer and the second wafer such that an upper surface of the first wafer and an upper surface of the second wafer face each other.

As another example, the nonvolatile memory device 200 may be manufactured in a cell over peri (COP) method. A peripheral circuit including the row decoder block 220, the page buffer block 230, the PFC block 240, the data input and output block 250, the buffer block 260, and the control logic block 270 may be implemented on a substrate. The memory cell array 110 may be implemented over the peripheral circuit. The peripheral circuit and the memory cell array 210 may be connected by using through vias.

Figure 4:
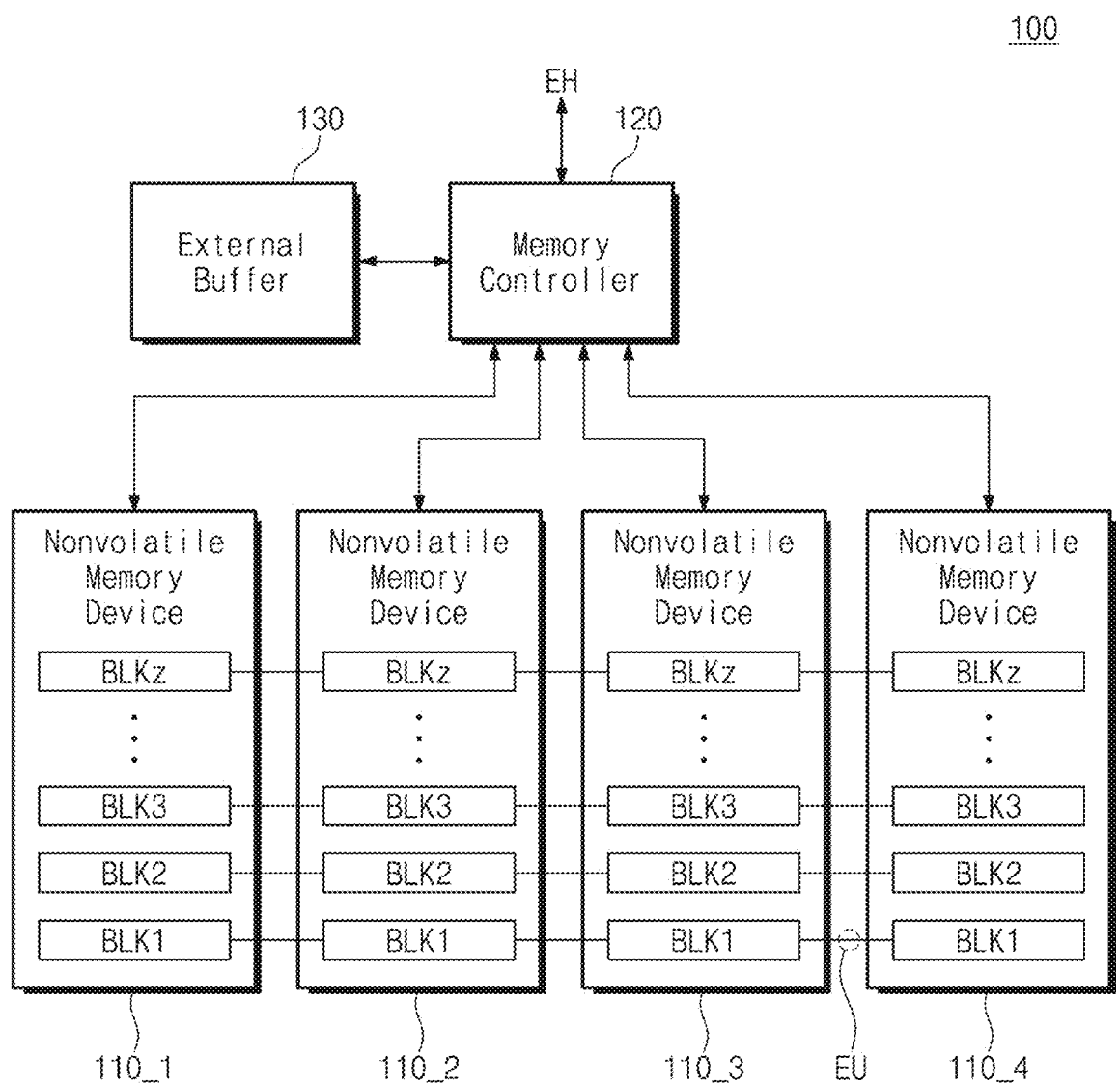
FIG. 4 illustrates an example in which a storage device organizes a plurality of nonvolatile memory devices, according to some implementations of the present disclosure.

FIG. 4 illustrates an example in which the storage device 100 organizes the plurality of nonvolatile memory devices 110_1, 110_2, 110_3, and 110_4. Referring to FIG. 4, the memory controller 120 may group the memory blocks of the plurality of nonvolatile memory devices 110_1, 110_2, 110_3, and 110_4. For example, the memory controller 120 may group the first memory blocks BLK1 of the plurality of nonvolatile memory devices 110_1, 110_2, 110_3, and 110_4, may group the second memory blocks BLK2 thereof, may group the third memory blocks BLK3 thereof, and may group the z-th memory blocks BLKz thereof.

Each group of memory blocks may be managed as an erase unit EU. The erase operations of memory blocks included in one erase unit EU may be linked with each other. For example, the memory controller 120 may perform the erase operations of the memory blocks included in one erase unit EU together (e.g., sequentially) so as to be linked with each other. In some implementations, the erase unit EU may correspond to the super block.

When the memory controller 120 intends to write data in the plurality of nonvolatile memory devices 110_1, 110_2, 110_3, and 110_4, the memory controller 120 may control the plurality of nonvolatile memory devices 110_1, 110_2, 110_3, and 110_4 such that the erase operations are performed on the memory blocks included in one erase unit EU. After the memory blocks included in one erase unit EU are erased, the memory controller 120 may write data in the memory blocks of the erase unit EU thus erased.

For example, an operation of securing a memory block (or the erase unit EU), in which data are to be written, through the erase operation(s) or an operation of writing data in the erased memory block (or erase unit EU) for the first time may be referred to as an operation of opening the memory block (or the erase unit EU). The memory block (or the erase unit EU) that includes a free space and is capable of storing data may be an opened memory block (or an opened erase unit EU).

For example, an operation of exhausting the free space of the opened memory block (or the opened erase unit EU) by writing data (or dummy data) may be referred to as an operation of closing the memory block (or the erase unit EU). The memory block (or the erase unit EU) that does not include a free space and is incapable of storing additional data (or in which the write of additional data is not permitted (or prohibited)) may be a closed memory block (or a closed erase unit EU).

In some implementations, the memory controller 120 may perform the write operations of the memory blocks included in the erase unit EU together so as to be linked with each other. After data to be written at one page included in each of the memory blocks belonging to the erase unit EU are collected, the memory controller 120 may control the plurality of nonvolatile memory devices 110_1, 110_2, 110_3, and 110_4 such that the write operations are performed together or simultaneously (or sequentially) with respect to the pages of the memory blocks included in the erase unit EU.

In some implementations, the memory controller 120 may manage a time difference between the erase operation and the write operation of the memory blocks of the plurality of nonvolatile memory devices 110_1, 110_2, 110_3, and 110_4. For example, the memory controller 120 may control the plurality of nonvolatile memory devices 110_1, 110_2, 110_3, and 110_4 such that the time difference between the erase operation and the write operation does not exceed a threshold value. The threshold value may be determined based on physical features of the plurality of nonvolatile memory devices 110_1, 110_2, 110_3, and 110_4. The time difference between the erase operation and the write operation may be referred to as an erase-program interval (EPI).

To manage the EPIs of the memory blocks of the plurality of nonvolatile memory devices 110_1, 110_2, 110_3, and 110_4, the memory controller 120 may perform the erase operations of memory blocks included in the erase unit EU together so as to be linked with each other. When the erase operations of the memory blocks included in the erase unit EU are performed together so as to be linked with each other, the EPIs of the memory blocks included in the erase unit EU may be managed together. Accordingly, the overhead that is necessary for the memory controller 120 to manage the EPIs of the memory blocks of the plurality of nonvolatile memory devices 110_1, 110_2, 110_3, and 110_4 may decrease.

Figure 5:
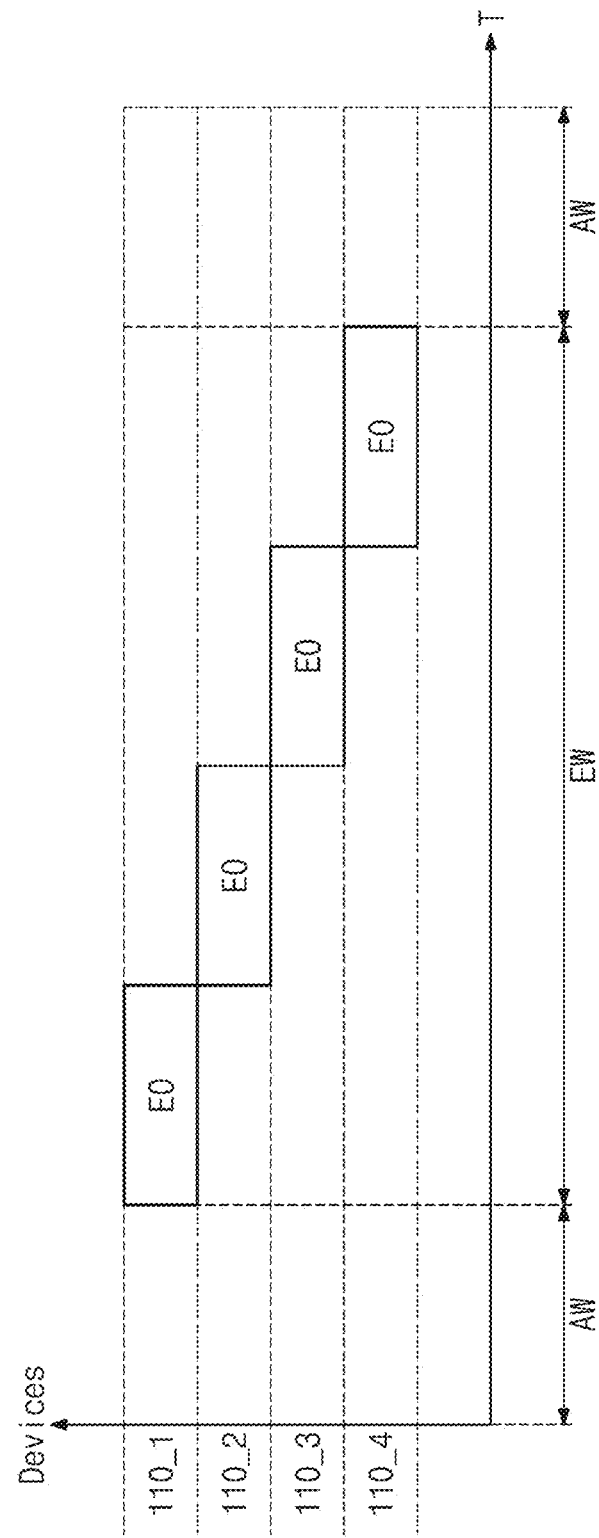
FIG. 5 is a diagram illustrating an example in which a storage device performs an on-time erase operation, according to some implementations of the present disclosure.

FIG. 5 is a diagram illustrating an example in which the storage device 100 performs an on-time erase operation. In FIG. 5, a horizontal axis represents a time T, and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated in FIG. 5.

Referring to FIGS. 1 and 5, the on-time erase operation may be performed to open new memory blocks (or the erase unit EU) when free spaces of opened memory blocks of the plurality of nonvolatile memory devices 110_1, 110_2, 110_3, and 110_4 are exhausted. The memory controller 120 may allow the plurality of nonvolatile memory devices 110_1, 110_2, 110_3, and 110_4 to sequentially perform the erase operations EO.

In some implementations, the memory controller 120 may control the plurality of nonvolatile memory devices 110_1, 110_2, 110_3, and 110_4 such that the plurality of nonvolatile memory devices 110_1, 110_2, 110_3, and 110_4 sequentially perform the erase operations EO in a given (or fixed) order.

In the on-time erase operation, a time period where the erase operations EO are performed in the plurality of nonvolatile memory devices 110_1, 110_2, 110_3, and 110_4 may be referred to as an erase window EW. During the erase window EW, the memory controller 120 may suspend the access to the plurality of nonvolatile memory devices 110_1, 110_2, 110_3, and 110_4. For example, even though there are pending access commands for the plurality of nonvolatile memory devices 110_1, 110_2, 110_3, and 110_4 transferred from the external host device EH, until the on-time erase operation, that is, the erase operations EO are completed, the memory controller 120 may wait without accessing the plurality of nonvolatile memory devices 110_1, 110_2, 110_3, and 110_4.

The memory controller 120 may control the plurality of nonvolatile memory devices 110_1, 110_2, 110_3, and 110_4 such that the erase operations EO are sequentially performed in the erase window EW. The memory controller 120 may restrict the maximum power consumption by sequentially performing the erase operations EO.

An access window AW may be present before or after the erase window EW. In the access window AW, the memory controller 120 may access the plurality of nonvolatile memory devices 110_1, 110_2, 110_3, and 110_4.

Figure 6:
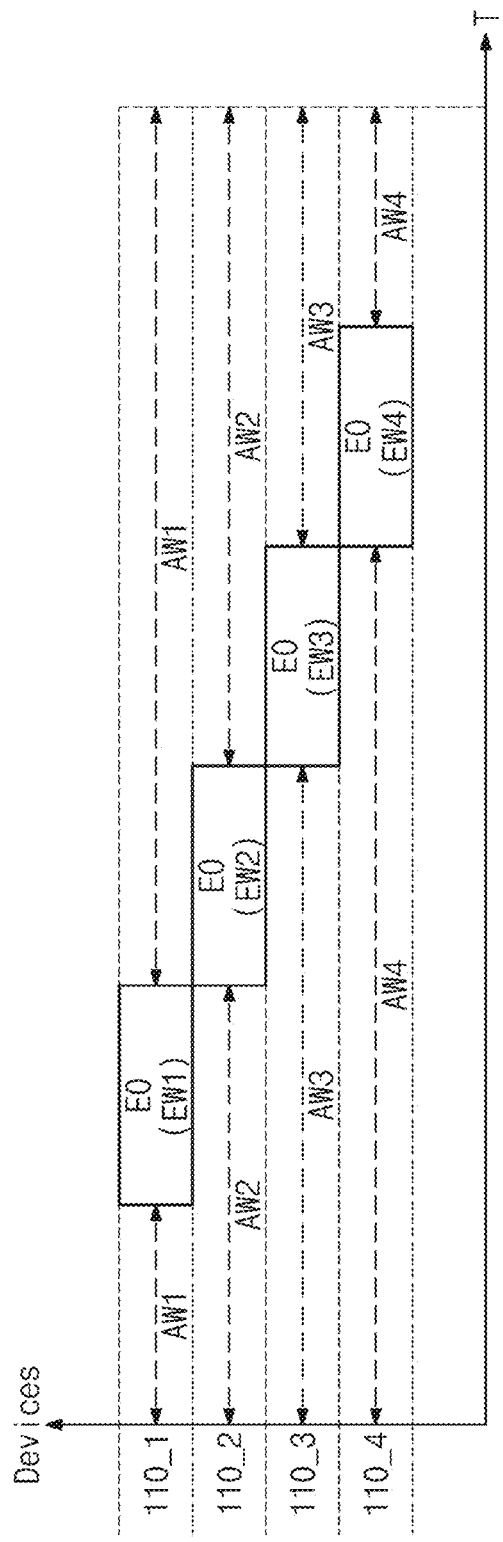
FIG. 6 is a diagram illustrating an example in which a storage device performs an early erase operation, according to some implementations of the present disclosure.

FIG. 6 is a diagram illustrating an example in which the storage device 100 performs an early erase operation, according to some implementations of the present disclosure. In FIG. 6, a horizontal axis represents a time T, and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated in FIG. 6.

Referring to FIGS. 1 and 6, when an early erase condition is satisfied, the memory controller 120 may control the plurality of nonvolatile memory devices 110_1, 110_2, 110_3, and 110_4 such that the erase operation EO is performed in one of the plurality of nonvolatile memory devices 110_1, 110_2, 110_3, and 110_4. For example, the memory controller 120 may control the plurality of nonvolatile memory devices 110_1, 110_2, 110_3, and 110_4 such that the erase operation EO is performed in a nonvolatile memory device satisfying the early erase condition from among the plurality of nonvolatile memory devices 110_1, 110_2, 110_3, and 110_4.

A time during which the erase operation EO is performed in the first nonvolatile memory device 110_1 may correspond to a first erase window EW1. During the first erase window EW1, the memory controller 120 may suspend the access to the first nonvolatile memory device 110_1 and may perform (or permit) the access to the remaining nonvolatile memory devices, for example, the second nonvolatile memory device 110_2, the third nonvolatile memory device 110_3, and the fourth nonvolatile memory device 110_4. A first access window AW1 may be present before or after the first erase window EW1. In the first access window AW1, the memory controller 120 may perform (or permit) the access to the first nonvolatile memory device 110_1.

A time during which the erase operation EO is performed in the second nonvolatile memory device 110_2 may correspond to a second erase window EW2. During the second erase window EW2, the memory controller 120 may suspend the access to the second nonvolatile memory device 110_2 and may perform (or permit) the access to the remaining nonvolatile memory devices, for example, the first nonvolatile memory device 110_1, the third nonvolatile memory device 110_3, and the fourth nonvolatile memory device 110_4. A second access window AW2 may be present before or after the second erase window EW2. In the second access window AW2, the memory controller 120 may perform (or permit) the access to the second nonvolatile memory device 110_2.

A time during which the erase operation EO is performed in the third nonvolatile memory device 110_3 may correspond to a third erase window EW3. During the third erase window EW3, the memory controller 120 may suspend the access to the third nonvolatile memory device 110_3 and may perform (or permit) the access to the remaining nonvolatile memory devices, for example, the first nonvolatile memory device 110_1, the second nonvolatile memory device 110_2, and the fourth nonvolatile memory device 110_4. A third access window AW3 may be present before or after the third erase window EW3. In the third access window AW3, the memory controller 120 may perform (or permit) the access to the third nonvolatile memory device 110_3.

A time during which the erase operation EO is performed in the fourth nonvolatile memory device 110_4 may correspond to a fourth erase window EW4. During the fourth erase window EW4, the memory controller 120 may suspend the access to the fourth nonvolatile memory device 110_4 and may perform (or permit) the access to the remaining nonvolatile memory devices, for example, the first nonvolatile memory device 110_1, the second nonvolatile memory device 110_2, and the third nonvolatile memory device 110_3. A fourth access window AW4 may be present before or after the fourth erase window EW4. In the fourth access window AW4, the memory controller 120 may perform (or permit) the access to the fourth nonvolatile memory device 110_4.

In the on-time erase operation described with reference to FIG. 5, the access to the plurality of nonvolatile memory devices 110_1, 110_2, 110_3, and 110_4 may be suspended while four memory blocks are erased. That is, the on-time erase operation may cause the reduction of performance of the storage device 100.

When the early erase condition is satisfied, the storage device 100 according to some implementations of the present disclosure may individually perform the erase operations of the plurality of nonvolatile memory devices 110_1, 110_2, 110_3, and 110_4, thus preventing the reduction of performance due to the on-time erase operation.

In some implementations, after the early erase operation is performed in one nonvolatile memory device among the plurality of nonvolatile memory devices 110_1, 110_2, 110_3, and 110_4, the additional erase operation for any other memory block of the one nonvolatile memory device may be prohibited until all the memory blocks belonging to (or sharing) the erase unit EU are erased. That is, in the plurality of nonvolatile memory devices 110_1, 110_2, 110_3, and 110_4, the erase operations may be determined (or aligned) and performed based on the erase unit EU. In the on-time erase operation or the early erase operation associated with one erase unit EU, that is, when the erase operations for the memory blocks of the one erase unit EU start, the erase operation of a memory block(s) of any other erase unit EU may be prohibited until all the memory blocks of the one erase unit EU are erased.

In some implementations, the memory controller 120 may control the plurality of nonvolatile memory devices 110_1, 110_2, 110_3, and 110_4 such that the erase operation based on the early erase condition is performed with the higher priority than any other operations. For example, when a specific nonvolatile memory device satisfies the early erase condition, the memory controller 120 may control the plurality of nonvolatile memory devices 110_1, 110_2, 110_3, and 110_4 such that the erase operation is performed prior to any other operations to be performed with respect to the nonvolatile memory device satisfying the early erase condition. The memory controller 120 may control the plurality of nonvolatile memory devices 110_1, 110_2, 110_3, and 110_4 such that the erase operation is preferentially performed through the scheduling or ordering of commands added to the queue associated with the nonvolatile memory device satisfying the early erase condition.

Figure 7:
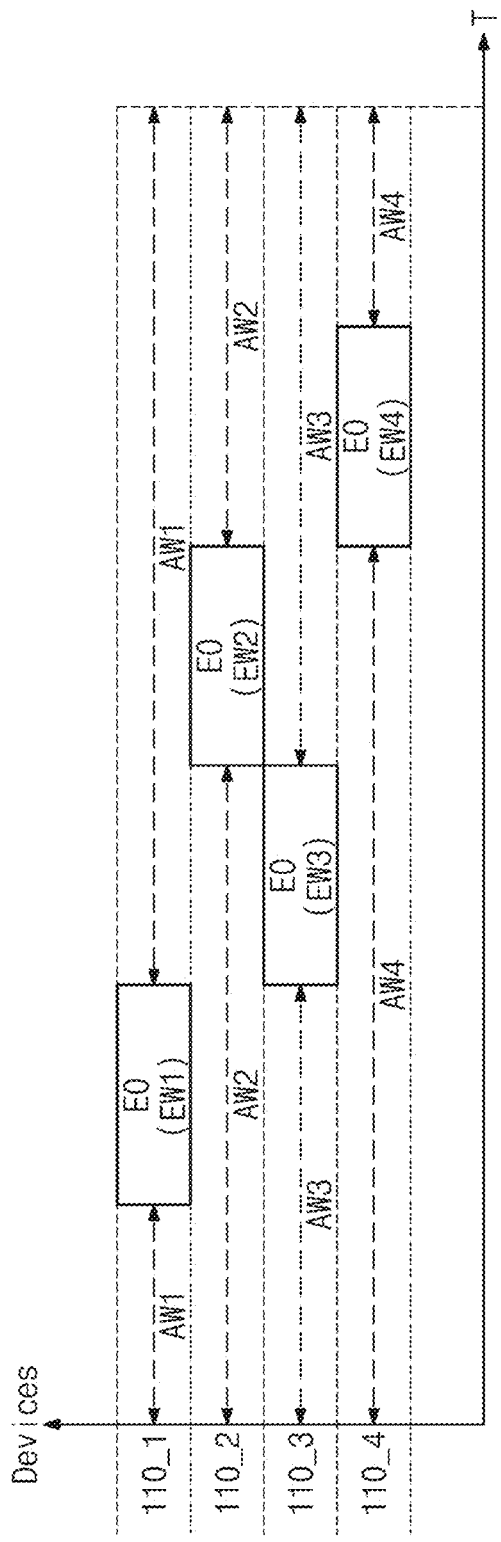
FIG. 7 is a diagram illustrating an example in which a storage device performs an early erase operation in a random order, according to some implementations of the present disclosure.

FIG. 7 is a diagram illustrating an example in which the storage device 100 performs an early erase operation in a random order, according to some implementations of the present disclosure. In FIG. 7, a horizontal axis represents a time T, and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated in FIG. 7.

Referring to FIGS. 1 and 7, unlike the on-time erase operation where the erase operations EO are performed in the plurality of nonvolatile memory devices 110_1, 110_2, 110_3, and 110_4 depending on the given (or fixed) order, in the early erase operation, the erase operations EO may be performed in the plurality of nonvolatile memory devices 110_1, 110_2, 110_3, and 110_4 without the given (or fixed) order.

For example, when one nonvolatile memory device among the plurality of nonvolatile memory devices 110_1, 110_2, 110_3, and 110_4 satisfies the early erase condition, the memory controller 120 may allow the one nonvolatile memory device to perform the erase operation.

Afterwards, when another nonvolatile memory device among the plurality of nonvolatile memory devices 110_1, 110_2, 110_3, and 110_4 satisfies the early erase condition, the memory controller 120 may allow the another nonvolatile memory device to perform the erase operation.

In some implementations, as illustrated in FIG. 7, the memory controller 120 may control the plurality of nonvolatile memory devices 110_1, 110_2, 110_3, and 110_4 such that the erase operations EO are performed in the order of the first nonvolatile memory device 110_1, the third nonvolatile memory device 110_3, the second nonvolatile memory device 110_2, and the fourth nonvolatile memory device 110_4 or in an arbitrary other order.

Figure 8:
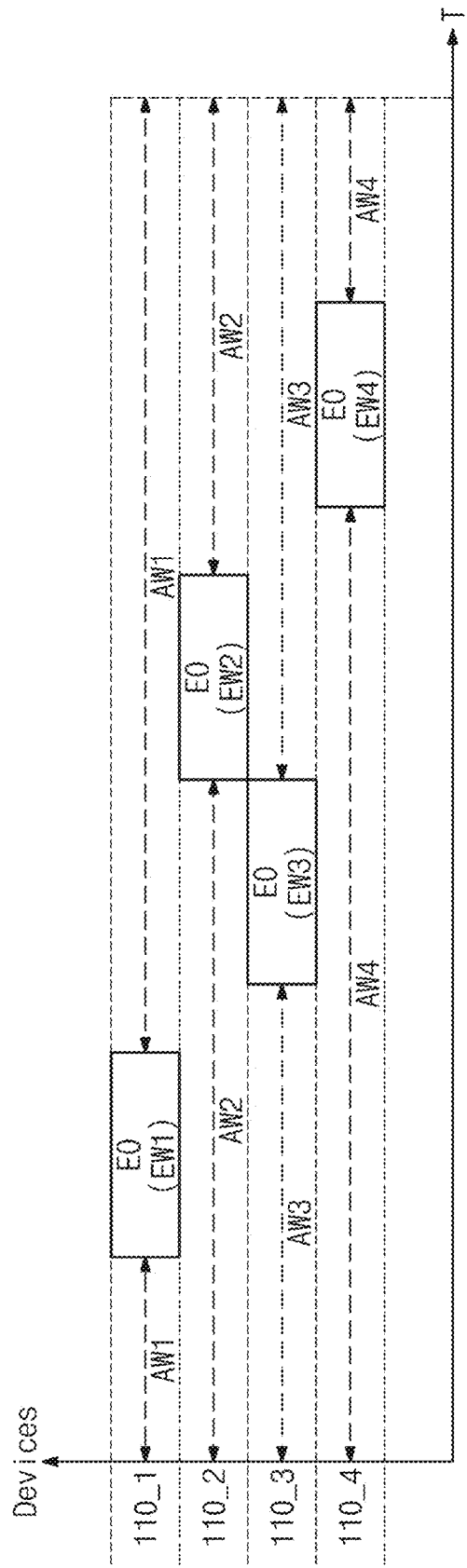
FIG. 8 is a diagram illustrating an example in which a storage device performs an early erase operation with a time interval, according to some implementations of the present disclosure.

FIG. 8 is a diagram illustrating an example in which the storage device 100 performs an early erase operation with a time interval, according to some implementations of the present disclosure. In FIG. 8, a horizontal axis represents a time T, and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated in FIG. 8.

Referring to FIGS. 1 and 8, unlike the on-time erase operation where the erase operations EO are continuously performed in the plurality of nonvolatile memory devices 110_1, 110_2, 110_3, and 110_4, in the early erase operation, the erase operations EO of the plurality of nonvolatile memory devices 110_1, 110_2, 110_3, and 110_4 may be performed with a time interval.

For example, when one nonvolatile memory device among the plurality of nonvolatile memory devices 110_1, 110_2, 110_3, and 110_4 satisfies the early erase condition, the memory controller 120 may allow the one nonvolatile memory device to perform the erase operation.

Afterwards, when another nonvolatile memory device among the plurality of nonvolatile memory devices 110_1, 110_2, 110_3, and 110_4 does not satisfy the early erase condition or when the memory controller 120 is accessing another nonvolatile memory device satisfying the early erase condition, the memory controller 120 may not perform the erase operation of the another nonvolatile memory device in succession with the erase operation of the one nonvolatile memory device, but it may postpone the erase operation of the another nonvolatile memory device.

In some implementations, as illustrated in FIG. 8, when a given time passes after the erase operation EO is performed in the first nonvolatile memory device 110_1, the memory controller 120 may control the plurality of nonvolatile memory devices 110_1, 110_2, 110_3, and 110_4 such that the erase operation EO is performed in the third nonvolatile memory device 110_3. Also, when a given time passes after the erase operation EO is performed in the second nonvolatile memory device 110_2, the memory controller 120 may control the plurality of nonvolatile memory devices 110_1, 110_2, 110_3, and 110_4 such that the erase operation EO is performed in the fourth nonvolatile memory device 110_4.

In some implementations, the memory controller 120 may instantaneously determine whether the plurality of nonvolatile memory devices 110_1, 110_2, 110_3, and 110_4 satisfy the early erase condition. For example, when one nonvolatile memory device satisfies the early erase condition but the erase operation of the one nonvolatile memory device is postponed, later, the memory controller 120 may again determine whether the one nonvolatile memory device satisfies the early erase condition. For example, after a factor causing the delay of the erase operation is removed, the memory controller 120 may again determine whether the one nonvolatile memory device satisfies the early erase condition. When there is again determined whether the one nonvolatile memory device does not satisfy the early erase condition, the memory controller 120 may cancel the erase operation of the one nonvolatile memory device.

Figure 9:
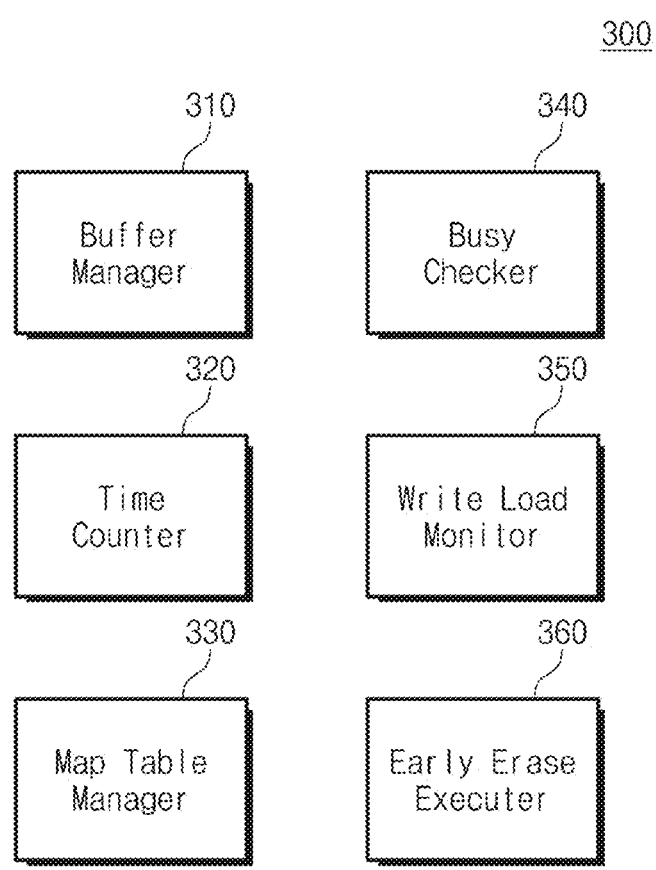
FIG. 9 is a diagram illustrating an example of components of a processor, according to some implementations of the present disclosure.

FIG. 9 is a diagram illustrating an example of components of a processor 300, according to some implementations of the present disclosure. In some implementations, the processor 300 may correspond to the processor 124 of the memory controller 120 of FIG. 2. Referring to FIGS. 2 and 9, the processor 300 may include a buffer manager 310, a time counter 320, a map table manager 330, a busy checker 340, a write load monitor 350, and an early erase executer 360.

The buffer manager 310 may manage the external buffer 130 through the buffer controller 125. For example, the buffer manager 310 may manage the capacity of the external buffer 130, in detail, the capacity of a storage space (e.g., a write buffer), which is used (or allocated) to stored write data, from among the storage space of the external buffer 130. The buffer manager 310 may provide information about the free capacity of the write buffer to the early erase executer 360. For example, the buffer manager 310 may provide the information about the free capacity of the write buffer to the early erase executer 360 periodically based on a time period, when the free capacity of the write buffer changes, or when the free capacity of the write buffer becomes smaller than a specific value. Alternatively, when the free capacity of the write buffer becomes equal to or greater than the specific value, the buffer manager 310 may provide notification information to the early erase executer 360.

The time counter 320 may manage time information for each opened memory block. For example, the time counter 320 may count a time (e.g., a time-after-erase) that passes after the erase operation is performed with respect to the opened memory block. When the time-after-erase of an arbitrary opened memory block(s) becomes greater than a specific value or periodically based on the time period, the time counter 320 may provide time information of the relevant memory block(s) to the early erase executer 360. Alternatively, when the time-after-erase of an arbitrary opened memory block(s) becomes equal to or smaller than the specific value, the time counter 320 may provide time information of the relevant memory block(s) to the early erase executer 360.

The map table manager 330 may manage the map table loaded to the internal buffer 123 or the external buffer 130. For example, the map table manager 330 may identify a write offset of an opened memory block(s) based on the map table. The write offset may indicate a location of a storage space of the opened memory block(s), in which data are to be written. The map table manager 330 may provide information of the opened memory block(s) and information of the write offset corresponding to the opened memory block(s), periodically based on the time period, when the write offset changes, or when the write offset becomes greater than a specific value. Alternatively, when the write offset of an arbitrary opened memory block(s) becomes equal to or smaller than the specific value, the map table manager 330 may provide information of the relevant memory block(s) to the early erase executer 360.

The busy checker 340 may monitor the queues of the plurality of memory management modules MM1 to MM4. The busy checker 340 may determine busy levels of the plurality of nonvolatile memory devices 110_1, 110_2, 110_3, and 110_4, based on commands pending in the queues of the plurality of memory management modules MM1 to MM4. For example, the busy level of each of the plurality of nonvolatile memory devices 110_1, 110_2, 110_3, and 110_4 may be based on the number of pending commands of each of the plurality of nonvolatile memory devices 110_1, 110_2, 110_3, and 110_4, for example, the number of read commands thereof. As the number of pending commands increases, the busy level of a relevant nonvolatile memory device may increase.

The busy checker 340 may provide information of the busy levels of the plurality of nonvolatile memory devices 110_1, 110_2, 110_3, and 110_4 to the early erase executer 360 periodically based on the time period or in response to the request of the early erase executer 360. Alternatively, when the busy level(s) of an arbitrary nonvolatile memory device(s) is greater than a specific value, the busy checker 340 may provide information of the busy level(s) of the relevant nonvolatile memory device(s) to the early erase executer 360. In contrast, when the busy level(s) of the arbitrary nonvolatile memory device(s) is smaller than or equal to the specific value, the busy checker 340 may provide information of the busy level(s) of the relevant nonvolatile memory device(s) to the early erase executer 360.

The write load monitor 350 may monitor write loads of the plurality of nonvolatile memory devices 110_1, 110_2, 110_3, and 110_4. For example, the write load of each of the plurality of nonvolatile memory devices 110_1, 110_2, 110_3, and 110_4 may be based on the frequency (or number) of write operations performed with respect to each of the plurality of nonvolatile memory devices 110_1, 110_2, 110_3, and 110_4. For example, as the frequency (or number) of write operations performed with respect to each of the plurality of nonvolatile memory devices 110_1, 110_2, 110_3, and 110_4 increases, the write load of each of the plurality of nonvolatile memory devices 110_1, 110_2, 110_3, and 110_4 may increase.

The write load monitor 350 may provide information of the write loads of the plurality of nonvolatile memory devices 110_1, 110_2, 110_3, and 110_4 to the early erase executer 360 periodically based on the time period or in response to the request of the early erase executer 360. Alternatively, when the write load(s) of an arbitrary nonvolatile memory device(s) becomes smaller than a specific value, the write load monitor 350 may provide information of the write load(s) of the relevant nonvolatile memory device(s) to the early erase executer 360. In contrast, when the write load(s) of the arbitrary nonvolatile memory device(s) becomes greater than or equal to the specific value, the write load monitor 350 may provide information of the write load(s) of the relevant nonvolatile memory device(s) to the early erase executer 360.

The early erase executer 360 may receive the pieces of information from the buffer manager 310, the time counter 320, the map table manager 330, the busy checker 340, and the write load monitor 350. The early erase executer 360 may determine whether to perform the early erase operation based on the pieces of information received from the buffer manager 310, the time counter 320, the map table manager 330, the busy checker 340, and the write load monitor 350. When it is determined that there is a need to perform the early erase operation, the early erase executer 360 may further select a nonvolatile memory device targeted for the early erase operation from among the plurality of nonvolatile memory devices 110_1, 110_2, 110_3, and 110_4.

In some implementations, the buffer manager 310, the time counter 320, the map table manager 330, the busy checker 340, the write load monitor 350, and the early erase executer 360 may be implemented with hardware (e.g., circuits), firmware or software executable in hardware, a combination of hardware and firmware, or a combination of hardware and software.

Figure 10:
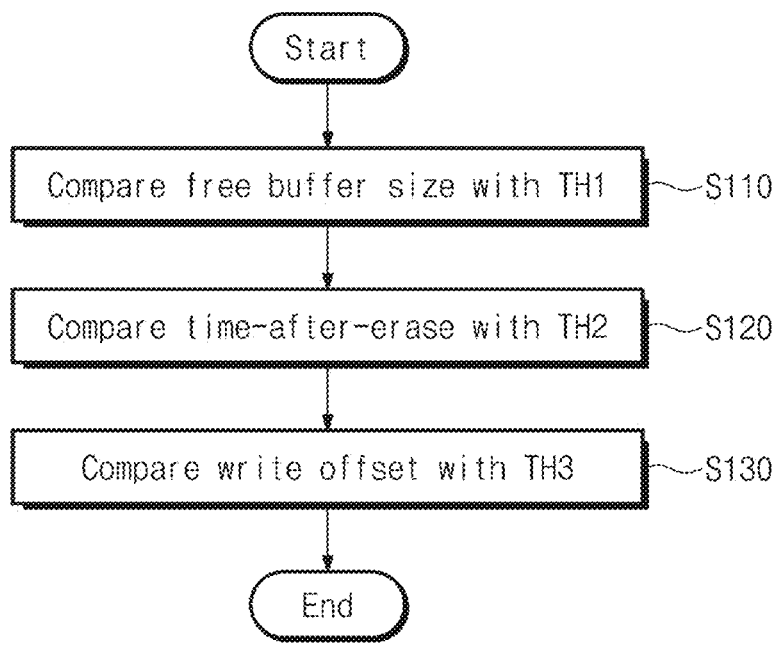
FIG. 10 is a diagram illustrating an example in which a storage device determines whether an early erase condition is satisfied, according to some implementations of the present disclosure.

FIG. 10 is a diagram illustrating an example in which the storage device 100 determines whether an early erase condition is satisfied, according to some implementations of the present disclosure. Referring to FIGS. 1, 9, and 10, in operation S110, the memory controller 120 may compare a free buffer size with a first threshold value TH1. For example, when the free buffer size of the write buffer storing data to be written in the plurality of nonvolatile memory devices 110_1, 110_2, 110_3, and 110_4 is smaller than the first threshold value TH1, the memory controller 120 may determine that at least part of the early erase condition is satisfied.

For example, the first threshold value TH1 may be determined based on the amount of write data capable of being input to the buffer memory while the on-time erase operation is performed. For example, the first threshold value TH1 may be set to a maximum value of the write data capable of being input to the buffer memory while the on-time erase operation is performed.

When it is possible to store the write data received from the external host device EH in the free buffer while the on-time erase operation is performed, at least part of the early erase condition may not be satisfied. When it is impossible to store the write data received from the external host device EH in the free buffer while the on-time erase operation is performed, at least part of the early erase condition may be satisfied. When there is not secured free buffer capable of suppressing the write operation while the on-time erase operation is performed, the memory controller 120 may determine that at least part of the early erase condition is satisfied.

In some implementations, the free buffer size of the write buffer may be managed by the buffer manager 310. The operation of comparing the free buffer size with the first threshold value TH1 may be performed by the buffer manager 310 or the early erase executer 360.

In operation S120, the memory controller 120 may compare a time-after-erase with a second threshold value TH2. In some implementations, as a time passing after the erase operation is performed in each memory block of the plurality of nonvolatile memory devices 110_1, 110_2, 110_3, and 110_4, that is, the time-after-erase (e.g., the EPI) increases, the reliability of data written in each memory block may decrease. When the time-after-erase reaches a threshold value, the memory controller 120 may write (e.g., pad) dummy data in each memory block and may close each memory block.

The second threshold value TH2 may be set to an arbitrary value smaller than the threshold value of the time-after-erase. When the time-after-erase is greater than the second threshold value TH2, the close of each memory block may be considered to be imminent. That is, when the time-after-erase is greater than the second threshold value TH2, regardless of the amount of free space of each memory block, the exhaustion of the free space may be considered to be imminent. When the time-after-erase is greater than the second threshold value TH2, the memory controller 120 may determine that at least part of the early erase condition is satisfied.

In some implementations, the threshold value of the time-after-erase and the second threshold value TH2 may change depending on the manufacturing process or design, that is, the physical characteristics of the plurality of nonvolatile memory devices 110_1, 110_2, 110_3, and 110_4.

In some implementations, the time-after-erase may be managed by the time counter 320. The operation of comparing the time-after-erase with the second threshold value TH2 may be performed by the time counter 320 or the early erase executer 360.

In operation S130, the memory controller 120 may compare the write offset with a third threshold value TH3. The write offset may indicate a location of a storage space of each memory block, in which data are to be written. Because data are written in each memory block based on sequential physical addresses, the write offset may correspond to the amount of data to be written in each memory block. When the write offset is greater than the third threshold value TH3, the free space of each memory block may be considered as being exhausted by the write operation. When the write offset is greater than the third threshold value TH3, the memory controller 120 may determine that at least part of the early erase condition is satisfied.

In some implementations, the write offset may be identified by the map table manager 330. The operation of comparing the write offset with the third threshold value TH3 may be performed by the map table manager 330 or the early erase executer 360.

In some implementations, the memory controller 120 may determine whether the early erase condition is satisfied, based on at least one of the first threshold value TH1, the second threshold value TH2, and the third threshold value TH3, or based on a combination of at least two thereof. For example, the memory controller 120 may determine whether the early erase condition is satisfied, based on the first threshold value TH1, the second threshold value TH2, or the third threshold value TH3. Alternatively, the memory controller 120 may determine whether the early erase condition is satisfied, based on the first threshold value TH1 and the second threshold value TH2, or based on the first threshold value TH1 and the third threshold value TH3. When the free buffer size is smaller than the first threshold value TH1 and the time-after-erase is greater than the second threshold value TH2 or when the free buffer size is smaller than the first threshold value TH1 and the time-after-erase is greater than the third threshold value TH3, the memory controller 120 may determine that the early erase condition is satisfied.

Figure 11:
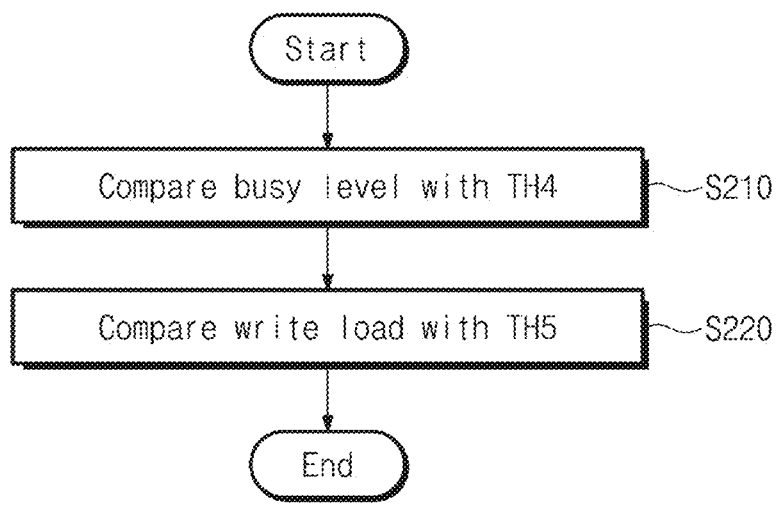
FIG. 11 is a diagram illustrating another example in which a storage device determines whether an early erase condition is satisfied, according to some implementations of the present disclosure.

FIG. 11 is a diagram illustrating another example in which the storage device 100 determines whether an early erase condition is satisfied, according to some implementations of the present disclosure. Referring to FIGS. 1, 9, and 11, in operation S210, the memory controller 120 may compare the busy levels of the plurality of nonvolatile memory devices 110_1, 110_2, 110_3, and 110_4 with a fourth threshold value TH4. For example, the busy level of each of the plurality of nonvolatile memory devices 110_1, 110_2, 110_3, and 110_4 may be based on the number of pending commands of each of the plurality of nonvolatile memory devices 110_1, 110_2, 110_3, and 110_4, for example, the number of read commands thereof. As the number of pending commands increases, the busy level of a relevant nonvolatile memory device may increase.

When the busy level is greater than the fourth threshold value TH4, the number of operations to be performed in the relevant nonvolatile memory device may be considered to be many. As the memory controller 120 determines that the nonvolatile memory device whose busy level is greater than the fourth threshold value TH4 does not satisfy the early erase condition, the performance of the storage device 100 may be prevented from being degraded by the early erase condition. For example, even though it is determined based on the first threshold value TH1, the second threshold value TH2, or the third threshold value TH3 (refer to FIG. 9) that the early erase condition is satisfied, the memory controller 120 may again determine that the nonvolatile memory device whose busy level is greater than the fourth threshold value TH4 does not satisfy the early erase condition.

In some implementations, the busy levels may be identified by the busy checker 340. The operation of comparing the busy levels with the fourth threshold value TH4 may be performed by the busy checker 340 or the early erase executer 360.

In operation S220, the memory controller 120 may compare the write loads of the plurality of nonvolatile memory devices 110_1, 110_2, 110_3, and 110_4 with a fifth threshold value TH5. For example, the write load of each of the plurality of nonvolatile memory devices 110_1, 110_2, 110_3, and 110_4 may be based on the number of write operations performed with respect to each of the plurality of nonvolatile memory devices 110_1, 110_2, 110_3, and 110_4. For example, as the number of write operations performed with respect to each of the plurality of nonvolatile memory devices 110_1, 110_2, 110_3, and 110_4 increases, the write load of each of the plurality of nonvolatile memory devices 110_1, 110_2, 110_3, and 110_4 may increase.

When the write load is smaller than the fifth threshold value TH5, the number of requests for the write operation of each of the plurality of nonvolatile memory devices 110_1, 110_2, 110_3, and 110_4 may be small. When the number of requests for the write operation of each of the plurality of nonvolatile memory devices 110_1, 110_2, 110_3, and 110_4 is small, the degree to which the performance of the storage device 100 is reduced due to the on-time erase operation may be small. As the memory controller 120 determines that the nonvolatile memory device whose write load is smaller than the fifth threshold value TH5 does not satisfy the early erase condition, the number of memory blocks targeted for management of the time-after-erase may decrease. For example, even though it is determined based on the first threshold value TH1, the second threshold value TH2, or the third threshold value TH3 (refer to FIG. 9) that the early erase condition is satisfied, the memory controller 120 may again determine that the nonvolatile memory device whose write load is smaller than the fifth threshold value TH5 does not satisfy the early erase condition.

In some implementations, the write loads may be identified by the write load monitor 350. The operation of comparing the write loads with the fifth threshold value TH5 may be performed by the write load monitor 350 or the early erase executer 360.

Figure 12:
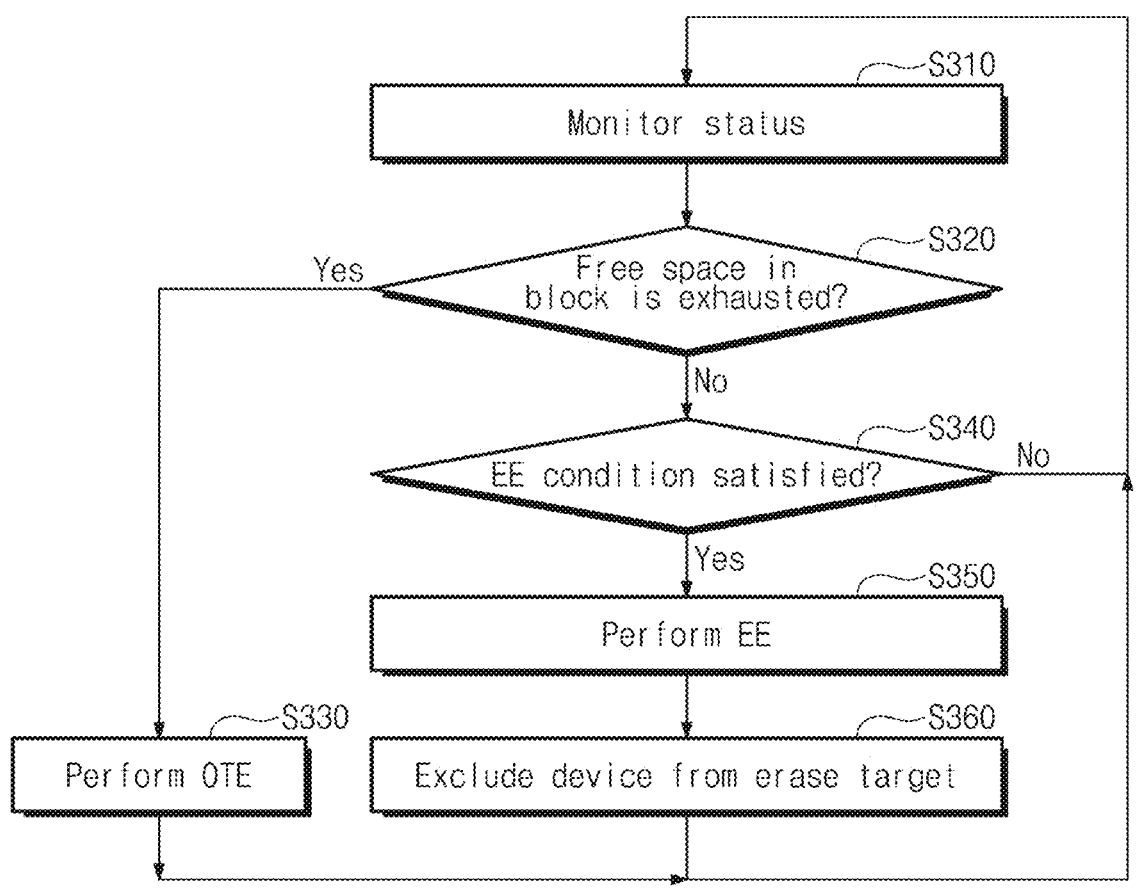
FIG. 12 is a diagram illustrating an example in which a storage device performs an erase operation, according to some implementations of the present disclosure.

FIG. 12 is a diagram illustrating an example in which the storage device 100 performs an erase operation, according to some implementations of the present disclosure. Referring to FIGS. 1 and 12, in operation S310, the memory controller 120 may monitor the status of each of the plurality of nonvolatile memory devices 110_1, 110_2, 110_3, and 110_4. For example, the memory controller 120 may monitor the free buffer size associated with the first threshold value TH1, the time-after-erase associated with the second threshold value TH2, the write offset associated with the third threshold value TH3, the busy level associated with the fourth threshold value TH4, and the write load associated with the fifth threshold value TH5.

In operation S320, the memory controller 120 may determine whether the free spaces of the opened memory blocks of the plurality of nonvolatile memory devices 110_1, 110_2, 110_3, and 110_4 are exhausted. When it is determined that the free spaces of the opened memory blocks of the plurality of nonvolatile memory devices 110_1, 110_2, 110_3, and 110_4 are exhausted, in operation S330, the memory controller 120 may perform an on-time erase operation OTE. As the on-time erase operation OTE is performed, the memory controller 120 may open new memory blocks. Afterwards, the memory controller 120 may again perform operation S310.

When it is determined that the free spaces of the opened memory blocks of the plurality of nonvolatile memory devices 110_1, 110_2, 110_3, and 110_4 are not exhausted, in operation S340, the memory controller 120 may determine whether the early erase (EE) condition is satisfied. When it is determined that the EE condition is not satisfied, the memory controller 120 may again perform operation S310.

When it is determined that the EE condition is satisfied, in operation S350, the memory controller 120 may perform the EE operation. For example, the memory controller 120 may perform the EE operation with respect to one nonvolatile memory device satisfying the EE condition from among the plurality of nonvolatile memory devices 110_1, 110_2, 110_3, and 110_4.

For example, the memory controller 120 may select a nonvolatile memory device, the busy level of which is the lowest, from among the plurality of nonvolatile memory devices 110_1, 110_2, 110_3, and 110_4 as a target of the EE operation. The busy levels of the plurality of nonvolatile memory devices 110_1, 110_2, 110_3, and 110_4 may be managed by the busy checker 340 (refer to FIG. 9). The operation of selecting one of the plurality of nonvolatile memory devices 110_1, 110_2, 110_3, and 110_4 as a target of the EE operation may be performed by the early erase executer 360.

Afterwards, in operation S360, the memory controller 120 may exclude, from an erase target, the nonvolatile memory device in which the EE operation is performed. For example, until any other memory blocks of the erase unit EU are erased through the EE operation or the on-time erase operation OTE, the memory controller 120 may exclude, from an erase target, the nonvolatile memory device in which the EE operation is performed. Afterwards, the memory controller 120 may again perform operation S310.

Figure 13:
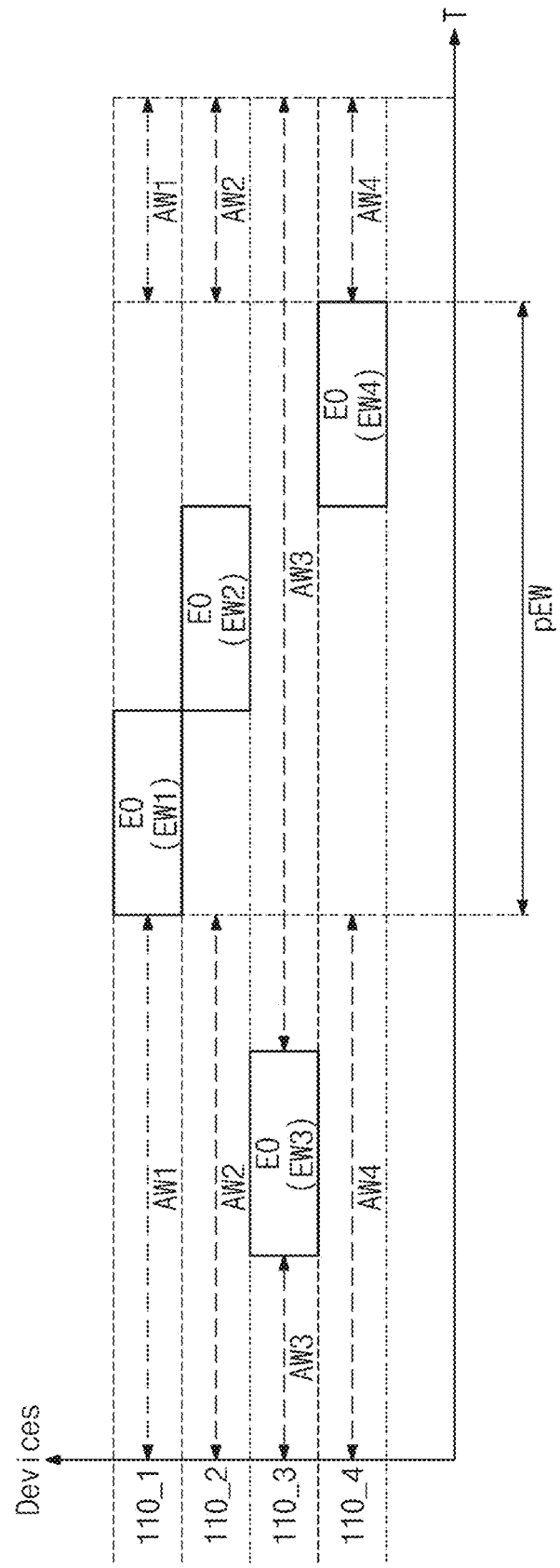
FIG. 13 illustrates an example in which an early erase operation and an on-time erase operation are mixed and performed, according to some implementations of the present disclosure.

FIG. 13 illustrates an example in which an early erase operation and an on-time erase operation are mixed and performed, according to some implementations of the present disclosure. In FIG. 13, a horizontal axis represents a time T, and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated in FIG. 13.

Referring to FIGS. 1 and 13, in the third nonvolatile memory device 110_3, the early erase condition may be satisfied, and the erase operation EO may be performed. The erase operation EO of the third nonvolatile memory device 110_3 may be performed during the third erase window EW3. The third access window AW3 may be present before and after the third erase window EW3. During the third access window AW3, the memory controller 120 may access the third nonvolatile memory device 110_3.

After the erase operation EO based on the early erase condition is performed in the third nonvolatile memory device 110_3, the free spaces of the first nonvolatile memory device 110_1, the second nonvolatile memory device 110_2, and the fourth nonvolatile memory device 110_4 may be exhausted. The memory controller 120 may perform the on-time erase operation with respect to the first nonvolatile memory device 110_1, the second nonvolatile memory device 110_2, and the fourth nonvolatile memory device 110_4.

The on-time erase operation may be performed during a partial erase window pEW. The first access window AW1 of the first nonvolatile memory device 110_1, the second access window AW2 of the second nonvolatile memory device 110_2, and the fourth access window AW4 of the fourth nonvolatile memory device 110_4 may be present before and after the partial erase window pEW. During the first access window AW1, the memory controller 120 may access the first nonvolatile memory device 110_1. During the second access window AW2, the memory controller 120 may access the second nonvolatile memory device 110_2. During the fourth access window AW4, the memory controller 120 may access the fourth nonvolatile memory device 110_4.

During the partial erase window pEW, the memory controller 120 may suspend the access to the first, second, and fourth nonvolatile memory devices 110_1, 110_2, and 110_4 in which the on-time erase operation is being performed. During the partial erase window pEW, the memory controller 120 may perform the access to the third nonvolatile memory device 110_3 in which the erase operation EO based on the early erase condition is completed.

When the erase operation EO based on the early erase condition is previously performed with respect to at least one of the plurality of nonvolatile memory devices 110_1, 110_2, 110_3, and 110_4, the number of nonvolatile memory devices that are prohibited from being accessed during the on-time erase operation may decrease. Also, when the erase operation EO based on the early erase condition is previously performed with respect to at least one of the plurality of nonvolatile memory devices 110_1, 110_2, 110_3, and 110_4, the length of the erase window EW (refer to FIG. 5) where the on-time erase operation is performed may decrease to the partial erase window pEW. The storage device 100 may reduce the overhead of the erase operation by adaptively performing the on-time erase operation and the early erase operation based on the early erase condition.

Figure 14:
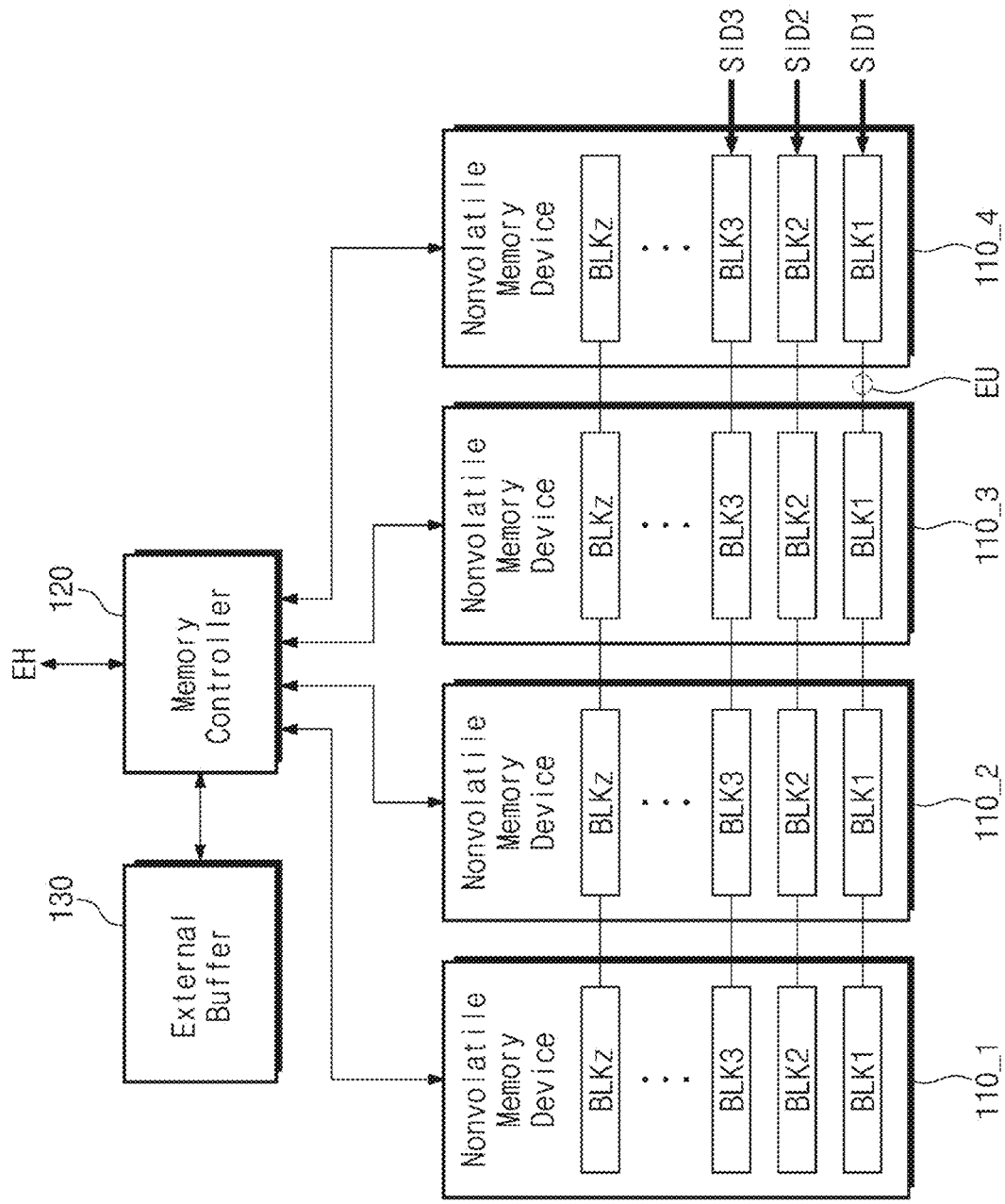
FIG. 14 illustrates an example in which a storage device organizes a plurality of nonvolatile memory devices based on a stream, according to some implementations of the present disclosure.

FIG. 14 illustrates an example in which the storage device 100 organizes the plurality of nonvolatile memory devices 110_1, 110_2, 110_3, and 110_4 based on a stream, according to some implementations of the present disclosure. Referring to FIG. 14, the memory controller 120 may open different erase units EU with respect to different stream identifiers SID1, SID2, and SID3.

For example, the memory controller 120 may open the erase unit EU of the first memory blocks BLK1 with regard to the first stream identifier SID1. Write data corresponding to the first stream identifier SID1 may be written in the erase unit EU of the first memory blocks BLK1.

The memory controller 120 may open the erase unit EU of the second memory blocks BLK2 with regard to the second stream identifier SID2. Write data corresponding to the second stream identifier SID2 may be written in the erase unit EU of the second memory blocks BLK2. The memory controller 120 may open the erase unit EU of the third memory blocks BLK3 with regard to the third stream identifier SID3. Write data corresponding to the third stream identifier SID3 may be written in the erase unit EU of the third memory blocks BLK3.

The memory controller 120 may determine the on-time erase operation or the early erase operation for each of the different stream identifiers SID1, SID2, and SID3. The on-time erase operations or the early erase operations associated with the different stream identifiers SID1, SID2, and SID3 may be performed independently of each other.

Figure 15:
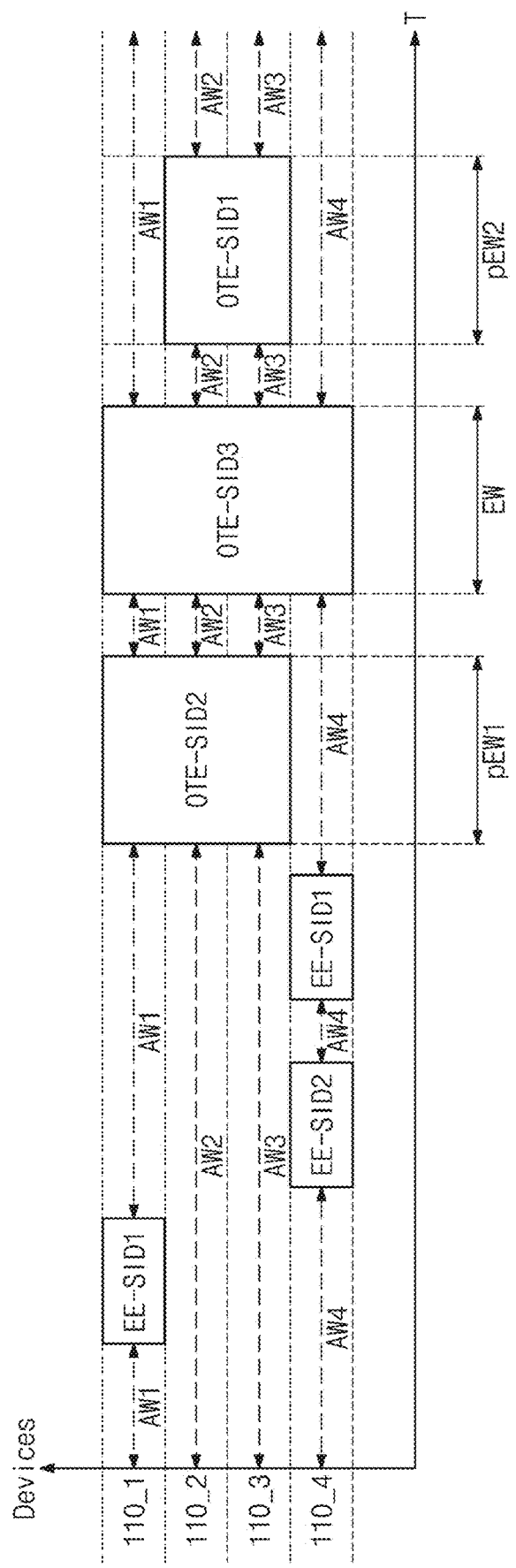
FIG. 15 illustrates an example in which an early erase operation and an on-time erase operation are mixed and performed, according to some implementations of the present disclosure.

FIG. 15 illustrates an example in which an early erase operation and an on-time erase operation are mixed and performed, according to some implementations of the present disclosure. In FIG. 15, a horizontal axis represents a time "T", and a vertical axis represents operations of the plurality of nonvolatile memory devices 110_1, 110_2, 110_3, and 110_4. Some implementations in which the erase operations EO are performed in memory blocks belonging to one erase unit EU from among the memory blocks of the plurality of nonvolatile memory devices 110_1, 110_2, 110_3, and 110_4 are illustrated FIG. 15.

Referring to FIGS. 1 and 15, the early erase condition may be satisfied in the first nonvolatile memory device 110_1 corresponding to the first stream identifier SID1, and the erase operation EE-SID1 based on the early erase condition may be performed with respect to the first nonvolatile memory device 110_1 corresponding to the first stream identifier SID1. During the erase operation EE-SID1 of the first nonvolatile memory device 110_1, the memory controller 120 may suspend the access to the first nonvolatile memory device 110_1.

After the erase operation EE-SID1 of the first nonvolatile memory device 110_1, the early erase condition may be satisfied in the fourth nonvolatile memory device 110_4 corresponding to the second stream identifier SID2, and the erase operation EE-SID2 based on the early erase condition may be performed with respect to the fourth nonvolatile memory device 110_4 corresponding to the second stream identifier SID2. During the erase operation EE-SID2 of the fourth nonvolatile memory device 110_4, the memory controller 120 may suspend the access to the fourth nonvolatile memory device 110_4. The erase operation EE-SID1 of the first nonvolatile memory device 110_1 and the erase operation EE-SID2 of the fourth nonvolatile memory device 110_4 may be performed with respect to different erase units EU.

After the erase operation EE-SID2 of the fourth nonvolatile memory device 110_4, the early erase condition may be satisfied in the fourth nonvolatile memory device 110_4 corresponding to the first stream identifier SID1, and the erase operation EE-SID1 based on the early erase condition may be performed with respect to the fourth nonvolatile memory device 110_4 corresponding to the first stream identifier SID1. During the erase operation EE-SID1 of the fourth nonvolatile memory device 110_4, the memory controller 120 may suspend the access to the fourth nonvolatile memory device 110_4. The erase operation EE-SID2 of the fourth nonvolatile memory device 110_4 and the erase operation EE-SID1 of the fourth nonvolatile memory device 110_4 may be performed with respect to different erase units EU.

After the erase operation EE-SID1 of the fourth nonvolatile memory device 110_4, the on-time erase operation OTE-SID2 associated with the second stream identifier SID2 may be performed. The on-time erase operation OTE-SID2 may be performed in the first nonvolatile memory device 110_1, the second nonvolatile memory device 110_2, and the third nonvolatile memory device 110_3 during the first partial erase window pEW1. During the on-time erase operation OTE_SID2, the memory controller 120 may suspend the access to the first nonvolatile memory device 110_1, the second nonvolatile memory device 110_2, and the third nonvolatile memory device 110_3.

After the on-time erase operation OTE_SID2, the on-time erase operation OTE-SID3 associated with the third stream identifier SID3 may be performed. The on-time erase operation OTE-SID3 may be performed in the first nonvolatile memory device 110_1, the second nonvolatile memory device 110_2, the third nonvolatile memory device 110_3, and the fourth nonvolatile memory device 110_4 during the erase window EW. During the on-time erase operation OTE_SID3, the memory controller 120 may suspend the access to the first nonvolatile memory device 110_1, the second nonvolatile memory device 110_2, the third nonvolatile memory device 110_3, and the fourth nonvolatile memory device 110_4.

After the on-time erase operation OTE_SID3, the on-time erase operation OTE-SID1 associated with the first stream identifier SID1 may be performed. The on-time erase operation OTE-SID1 may be performed in the second nonvolatile memory device 110_2 and the third nonvolatile memory device 110_3 during the second partial erase window pEW2. During the on-time erase operation OTE_SID1, the memory controller 120 may suspend the access to the second nonvolatile memory device 110_2 and the third nonvolatile memory device 110_3.

The memory controller 120 may access the first nonvolatile memory device 110_1 during the first access window AW1, may access the second nonvolatile memory device 110_2 during the second access window AW2, may access the third nonvolatile memory device 110_3 during the third access window AW3, and may access the fourth nonvolatile memory device 110_4 during the fourth access window AW4.

The on-time erase operations or the early erase operations associated with the different stream identifiers SID1, SID2, and SID3 may be performed independently of each other. Until the erase operations of the memory blocks of the erase unit EU corresponding to one stream identifier are completed, the erase operations of the memory blocks of another erase unit EU corresponding to the one stream identifier may be prohibited.

Figure 16:
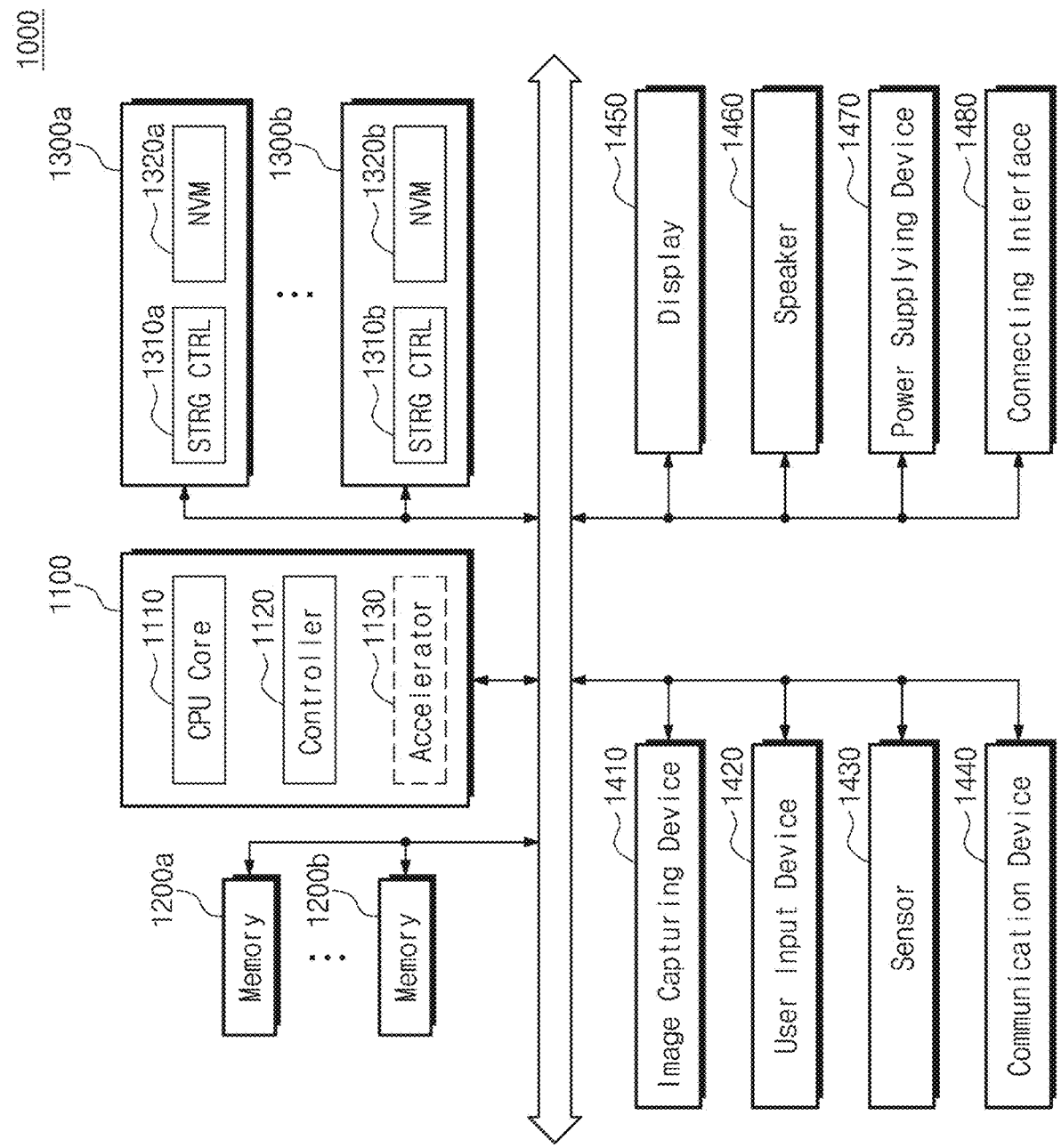
FIG. 16 is a diagram illustrating a system according to some implementations of the present disclosure.

FIG. 16 is a diagram of a system 1000 to which a storage device is applied, according to some implementations of the present disclosure. The system 1000 of FIG. 16 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 16 is not necessarily limited to the mobile system and may be a PC, a laptop computer, a server, a media player, or an automotive device (e.g., a navigation device).

Referring to FIG. 16, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some implementations, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memoryies (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In some implementations, the storage device 100 described with reference to FIGS. 1 to 15 may be implemented with the storage devices 1300*a* and 1300*b*. For example, the storage devices 1300*a* and 1300*b* may adaptively perform the early erase operation and the on-time erase operation. The descriptions of the storage device 100 described with reference to FIGS. 1 to 15 may be equally applied to the storage devices 1300*a* and 1300*b* of FIG. 16.

In the above implementations, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above implementations, components are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

According to implementations of the present disclosure, the erase operations may be distributed and performed through an early erase scheme. Accordingly, a storage device with an improved operating speed and an operating method of the storage device are provided.

While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. A storage device comprising:
   a plurality of nonvolatile memory devices each including a plurality of memory blocks;
   a memory controller configured to control the plurality of nonvolatile memory devices; and
   a buffer memory configured to buffer data to be written in the plurality of nonvolatile memory devices,
   wherein, in an on-time erase operation, the memory controller is configured to control the plurality of nonvolatile memory devices such that an erase operation is performed in a memory block for each of the plurality of nonvolatile memory devices,
   wherein, when an early erase condition is satisfied, the memory controller is configured to:
      select a nonvolatile memory device among the plurality of nonvolatile memory devices, the selected nonvolatile memory device having a lowest busy level among the plurality of nonvolatile memory devices; and
      control the selected nonvolatile memory device such that the erase operation is performed in a memory block of the selected nonvolatile memory device, and
   wherein, when a free capacity of the buffer memory is smaller than a first threshold value, the memory controller is configured to determine that the early erase condition is satisfied.

2. The storage device of claim 1, wherein the first threshold value is based on an amount of data capable of being input to the buffer memory while the on-time erase operation is performed.

3. The storage device of claim 1, wherein the memory controller is configured to determine that at least one nonvolatile memory device satisfies the early erase condition when a time passing after an opened memory block of the at least one nonvolatile memory device among the plurality of nonvolatile memory devices is erased is greater than a second threshold value.

4. The storage device of claim 1, wherein the memory controller is configured to determine that at least one nonvolatile memory device satisfies the early erase condition when an amount of data written in an opened memory block of the at least one nonvolatile memory device among the plurality of nonvolatile memory devices is greater than a second threshold value.

5. The storage device of claim 1, wherein the memory controller is configured to determine that at least one nonvolatile memory device does not satisfy the early erase condition when a busy level of the at least one nonvolatile memory device among the plurality of nonvolatile memory devices is greater than a second threshold value.

6. The storage device of claim 1, wherein the memory controller is configured to determine that the plurality of nonvolatile memory devices do not satisfy the early erase condition when write loads of the plurality of nonvolatile memory devices are smaller than a second threshold value.

7. The storage device of claim 1, wherein the memory controller is configured to suspend an access to the plurality of nonvolatile memory devices while the on-time erase operation is performed in the plurality of nonvolatile memory devices.

8. The storage device of claim 1, wherein the memory controller is configured to access the remaining nonvolatile memory devices other than the selected nonvolatile memory device of the plurality of nonvolatile memory devices while the erase operation based on the early erase condition is performed in the selected nonvolatile memory device.

9. The storage device of claim 1, wherein, when the early erase condition is again satisfied after the erase operation is performed in the selected nonvolatile memory device based on the early erase condition, the memory controller is configured to:
 select another nonvolatile memory device among the remaining nonvolatile memory devices other than the selected nonvolatile memory device of the plurality of nonvolatile memory devices; and
 control the selected another nonvolatile memory device such that the erase operation is performed in a memory block of the selected another nonvolatile memory device.

10. The storage device of claim 1, wherein the memory controller is configured to control the remaining nonvolatile memory devices other than the selected nonvolatile memory device of the plurality of nonvolatile memory devices such that the on-time erase operation is performed in the remaining nonvolatile memory devices after the erase operation is performed in the selected nonvolatile memory device based on the early erase condition and when free spaces of opened memory blocks of the plurality of nonvolatile memory devices are exhausted.

11. The storage device of claim 10, wherein the memory controller is configured to suspend an access to the remaining nonvolatile memory devices while the on-time erase operation is performed in the remaining nonvolatile memory devices.

12. The storage device of claim 1, wherein the plurality of nonvolatile memory devices are configured to perform erase operations continuously and sequentially in the on-time erase operation.

13. A method of operating a storage device which includes a plurality of nonvolatile memory devices, each memory device including a plurality of memory blocks, the method comprising:
 performing an on-time erase operation in which erase operations are continuously performed in memory blocks respectively included in the plurality of nonvolatile memory devices; and
 when an early erase condition is satisfied, performing an erase operation with respect to a memory block belonging to a nonvolatile memory device among the plurality of nonvolatile memory devices, the nonvolatile memory device having a lowest busy level among the plurality of nonvolatile memory devices.

14. The method of claim 13, wherein the storage device further includes a buffer memory configured to buffer data to be written in the plurality of nonvolatile memory devices, and wherein the method further comprises:
 when a free capacity of the buffer memory is smaller than a first threshold value and when a time passing after an opened memory block of at least one nonvolatile memory device among the plurality of nonvolatile memory devices is erased is greater than a second threshold value, determining that the early erase condition is satisfied.

15. The method of claim 13, wherein the storage device further includes a buffer memory configured to buffer data to be written in the plurality of nonvolatile memory devices, and wherein the method further comprises:
 when a free capacity of the buffer memory is smaller than a first threshold value and when an amount of data written in an opened memory block of at least one nonvolatile memory device among the plurality of nonvolatile memory devices is greater than a second threshold value, determining that the early erase condition is satisfied.

16. The method of claim 13, wherein the storage device further includes a buffer memory configured to buffer data to be written in the plurality of nonvolatile memory devices, and wherein the method further comprises:
 when a free capacity of the buffer memory is smaller than a first threshold value and when a busy level of at least one nonvolatile memory device among the plurality of nonvolatile memory devices is smaller than or equal to a second threshold value, determining that the early erase condition is satisfied.

17. The method of claim 13, wherein the storage device further includes a buffer memory configured to buffer data to be written in the plurality of nonvolatile memory devices, and wherein the method further comprises:
 when a free capacity of the buffer memory is smaller than a first threshold value and when write loads of the plurality of nonvolatile memory devices are greater than or equal to a second threshold value, determining that the early erase condition is satisfied.

18. The method of claim 13, wherein, during the on-time erase operation, an access to the plurality of nonvolatile memory devices is suspended, and an access to the remaining nonvolatile memory devices other than the nonvolatile memory device of the plurality of nonvolatile memory devices is permitted.

19. A storage device comprising:
 a plurality of nonvolatile memory devices each including a plurality of memory blocks;
 a buffer memory configured to buffer data to be written in the plurality of nonvolatile memory devices; and
 a memory controller configured to control the plurality of nonvolatile memory devices,
 wherein, in an on-time erase operation, the memory controller is configured to sequentially control the plurality of nonvolatile memory devices such that an erase operation is performed in a memory block for each of the plurality of nonvolatile memory devices,
 wherein, when an early erase condition is satisfied, the memory controller is configured to:
  select a nonvolatile memory device among the plurality of nonvolatile memory devices; and
  control the selected nonvolatile memory device such that the erase operation is performed in a memory block of the selected nonvolatile memory device,
 wherein the memory controller is configured to determine that the early erase condition is satisfied when a free capacity of the buffer memory is smaller than a first threshold value and when a time passing after a first opened memory block of at least one first nonvolatile memory device among the plurality of nonvolatile memory devices is erased is greater than a second threshold value, and wherein the memory controller is configured to determine that the early erase condition is satisfied when the free capacity of the buffer memory is smaller than the first threshold value and when an amount of data written in a second opened memory block of at least one second nonvolatile memory device among the plurality of nonvolatile memory devices is greater than a third threshold value.

* * * * *